(12) United States Patent
Kobayashi et al.

(10) Patent No.: US 12,347,245 B2
(45) Date of Patent: Jul. 1, 2025

(54) VEHICLE MANAGEMENT SYSTEM AND VEHICLE INSPECTION METHOD

(71) Applicant: TOYOTA JIDOSHA KABUSHIKI KAISHA, Toyota (JP)

(72) Inventors: Ryosuke Kobayashi, Nagakute (JP); Tomokazu Maya, Nagoya (JP); Tsuyoshi Okada, Nagoya (JP); Hiromitsu Fujii, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 408 days.

(21) Appl. No.: 18/052,244

(22) Filed: Nov. 3, 2022

(65) Prior Publication Data

US 2023/0245505 A1 Aug. 3, 2023

(30) Foreign Application Priority Data

Jan. 28, 2022 (JP) ................................ 2022-011631

(51) Int. Cl.
*G07C 5/00* (2006.01)
*B60W 60/00* (2020.01)
*G07C 5/04* (2006.01)

(52) U.S. Cl.
CPC ............. *G07C 5/008* (2013.01); *B60W 60/00* (2020.02); *G07C 5/04* (2013.01)

(58) Field of Classification Search
CPC .......... G07C 5/008; G07C 5/04; B60W 60/00
See application file for complete search history.

(56) References Cited

U.S. PATENT DOCUMENTS

| 6,694,235 | B2* | 2/2004 | Akiyama | H04L 67/12 |
| | | | | 455/418 |
| 9,406,177 | B2* | 8/2016 | Attard | G07C 5/0808 |
| 10,279,682 | B2* | 5/2019 | Tsuda | B60R 21/00 |
| 10,991,242 | B2* | 4/2021 | Taylor | H04Q 9/00 |
| 2017/0234689 | A1* | 8/2017 | Gibson | B60W 50/14 |
| | | | | 701/25 |
| 2019/0049981 | A1* | 2/2019 | Fischer | B60W 50/08 |

FOREIGN PATENT DOCUMENTS

JP 2019131187 A 8/2019

* cited by examiner

*Primary Examiner* — Gertrude Arthur Jeanglaude
(74) *Attorney, Agent, or Firm* — Dickinson Wright, PLLC

(57) ABSTRACT

A vehicle inspection method includes first and second transmission steps, and first and second determination steps. In the first transmission step, a vehicle transmits a first state detected by a first sensor mounted on the vehicle to a server, during autonomous driving. In the first determination step, the server determines a pass or a fail of the vehicle for the first inspection item by using the first state received from the vehicle. In the second determination step, the vehicle determines a pass or a fail for the second inspection item by using a second state detected by a second sensor mounted on the vehicle, during autonomous driving. In the second transmission step, the vehicle transmits a determination result of the second inspection item to the server in a case where a fail is determined for the second inspection item.

12 Claims, 11 Drawing Sheets

FIG. 4

| FIRS INSPECTION: INSPECTION IN WHICH REAL-TIME PERFORMANCE IS LOW ||
|---|---|
| FIRST INSPECTION ITEM | COMPONENT ABNORMALITY CAUSED BY AGING DETERIORATION |
| FIRST STATE | POSITION, WEIGHT, VEHICLE SPEED, SOC, THE NUMBER OF STOPS, THE NUMBER OF TIMES OF SUDDEN BRAKING, ⋯ |
| SECOND INSPECTION: INSPECTION IN WHICH REAL-TIME PERFORMANCE IS HIGH ||
| SECOND INSPECTION ITEM | AIR LEAK OF TIRE |
| SECOND STATE | AIR PRESSURE OF TIRE |

VEHICLE MANAGEMENT SYSTEM AND VEHICLE INSPECTION METHOD

CROSS-REFERENCE TO RELATED APPLICATION

This application claims priority to Japanese Patent Application No. 2022-011631 filed on Jan. 28, 2022, incorporated herein by reference in its entirety.

BACKGROUND

1. Technical Field

The present disclosure relates to a vehicle management system and a vehicle inspection method.

2. Description of Related Art

Japanese Unexamined Patent Application Publication No. 2019-131187 (JP 2019-131187 A) discloses a technique of executing a diagnosis of a vehicle by a cloud service using the Internet. In the technique disclosed in JP 2019-131187 A, in a case where an abnormality is diagnosed by a primary diagnosis executed by the vehicle and a driver can detect the abnormality, a secondary diagnosis related to the abnormality is requested from the vehicle to a server of a business operator of the cloud service. In this case, the vehicle transmits data for the secondary diagnosis to the server. In the technique disclosed in JP 2019-131187 A, the secondary diagnosis is not executed in a case where the abnormality of the vehicle is minor (to the extent that cannot be detected by the driver or to the extent that the vehicle traveling is not immediately affected).

SUMMARY

In recent years, mobility as a service (MaaS) has been attracting attention. In order to improve the convenience of the MaaS, it has been proposed to utilize a technique, such as car sharing or autonomous driving.

It is conceivable to manage a plurality of autonomous driving vehicles by the server such that the autonomous driving vehicle can be provided in response to a request from a user. A business operator that provides the autonomous driving vehicle is requested to appropriately execute daily maintenance of the autonomous driving vehicle. In order to detect the abnormality in the autonomous driving vehicle at an early stage, it is desirable to execute a vehicle inspection even during autonomous driving.

In order for the server to accurately grasp a state of the vehicle, it is desirable to sequentially transmit the state of the vehicle detected by the vehicle from the vehicle to the server. In a case where the abnormality has occurred in the vehicle, it is desirable that the server grasp that the abnormality has occurred in the vehicle, even when the abnormality is minor. However, in a case where an amount of information transmitted from the managed vehicle to the server is increased, a processing load on the server (for example, an amount of operation for information processing) is increased, and a communication cost is increased.

The present disclosure is to reduce a load on the server that manages the autonomous driving vehicle and appropriately execute maintenance of the autonomous driving vehicle.

A first aspect of the present disclosure relates to a vehicle management system including a vehicle, and a server. The server includes a first inspection device configured to execute a first inspection of determining a pass or a fail for a first inspection item. The vehicle includes a control device, a second inspection device, a first sensor, a second sensor, and a communication device. The control device is configured to execute control to cause the vehicle to travel by autonomous driving. The second inspection device is configured to execute a second inspection of determining a pass or a fail for a second inspection item different from the first inspection item. The first sensor is configured to detect a first state corresponding to the first inspection item. The second sensor is configured to detect a second state corresponding to the second inspection item. The communication device is configured to sequentially transmit the first state detected by the first sensor during autonomous driving of the vehicle to the server. The first inspection device is configured to execute the first inspection for the vehicle by using the first state sequentially received from the vehicle. The second inspection device is configured to execute the second inspection by using the second state detected by the second sensor during autonomous driving of the vehicle. Moreover, the communication device is configured to transmit a result of the second inspection to the server in a case where a fail is determined by the second inspection.

With the configuration described above, the first state corresponding to the first inspection item is sequentially transmitted from the vehicle to the server. Therefore, the server can accurately grasp the state of the vehicle during autonomous driving (first state detected by the first sensor), and a pass or a fail for the first inspection item can be determined by using the first state sequentially received from the vehicle during autonomous driving.

In addition, with the configuration described above, a pass or a fail for the second inspection item is determined by the vehicle. In a case where an abnormality related to the second inspection item occurs in the vehicle during autonomous driving, the server can receive a notification from the vehicle that the abnormality has occurred in the vehicle. While a pass is determined by the second inspection, the server does not receive the result of the second inspection, so that the server can grasp that the abnormality related to the second inspection item does not occur in the vehicle during autonomous driving. While a pass is determined by the second inspection, neither the second state nor the result of the second inspection is transmitted from the vehicle to the server, so that the amount of information transmitted from the vehicle to the server can be reduced. As a result, the load on the server is reduced.

With the configuration described above, the server receives the information corresponding to each inspection item with respect to one vehicle from the vehicle, and it is easy for the server to accurately grasp the state of the vehicle during autonomous driving. As a result, it is possible to appropriately execute the maintenance of the autonomous driving vehicle.

It should be noted that the communication device of the vehicle may transmit the information related to the vehicle to the server together with vehicle identification information (vehicle ID). The control device and the second inspection device in the vehicle may be realized by one computer or may be realized by individual computers. The control device of the vehicle may be composed of one computer or may include a plurality of computers.

In the vehicle management system described above, requested real-time performance may be higher in the second inspection item than in the first inspection item.

In relation to the inspection items, as requested monitoring interval and determination interval are shorter, the requested real-time performance is higher. In the vehicle management system having the configuration described above, monitoring (detection of the second state) and the determination are executed in the vehicle for the second inspection item, so that it is easy to execute the monitoring and the determination in a short cycle. As described above, by setting the inspection item having a low requested real-time performance as the first inspection item and the inspection item having a high requested real-time performance as the second inspection item, it is easy to meet the request of each inspection item.

The first inspection item may include an item for checking presence or absence of a component abnormality caused by aging deterioration. The second inspection item may include an item for checking presence or absence of an air leak of a tire.

Advanced analysis tends to be needed to accurately determine the presence or absence of the component abnormality caused by the aging deterioration. On the other hand, the presence or absence of the air leak (for example, a slow leak) of the tire can be easily determined from the transition of the air pressure of the tire without executing the advanced analysis. In general, increasing the information processing capability of the server provided outside the vehicle is easier than increasing the information processing capability of the computer mounted on the vehicle. The computer mounted on vehicle is restricted by design in terms of size and cost. For this reason, it is easier for the server to execute the advanced analysis than for the vehicle. As described above, by setting the inspection item that needs the advanced analysis as the first inspection item and the inspection item that does not need the advanced analysis as the second inspection item, it is easy to execute an accurate determination for each inspection item.

The first state may include at least one of weight of the vehicle, a vehicle speed of the vehicle, the number of stops of the vehicle, the number of times of sudden braking of the vehicle, a position of the vehicle, and an SOC of a power storage device mounted on the vehicle. The second state may include an air pressure of a tire.

With the configuration described above, it is easy for the server to accurately determine the presence or absence of the abnormality caused by the aging deterioration with respect to at least one of a propulsion device (for example, a drive motor) mounted on the vehicle, a braking device, a suspension, and a power storage device (for example, a drive battery). In addition, with the configuration described above, it is easy for the vehicle to accurately determine the presence or absence of the air leak (for example, a slow leak) of the tire based on the air pressure of the tire.

The communication device may be configured to transmit the first state detected by the first sensor to the server in a case where a degree of deviation between the first state detected by the first sensor during autonomous driving of the vehicle and the first state that is most recently transmitted exceeds a predetermined level. The communication device may be configured not to transmit the first state detected by the first sensor to the server in a case where the degree of deviation does not exceed the predetermined level.

With the configuration described above, in a case where the current first state detected by the first sensor in the vehicle is not significantly changed from the most recently first state transmitted from the vehicle to the server (that is, newest first state received from the vehicle by the server), the current first state detected by the first sensor is not transmitted to the server. By not receiving a detection value of the first sensor from the vehicle, the server can grasp that the first state is not significantly changed. The detection value of the first sensor is not transmitted from the vehicle to the server, so that the amount of information transmitted from the vehicle to the server can be reduced. As a result, the load on the server is reduced.

A second aspect of the present disclosure relates to a vehicle management system including a first vehicle, a second vehicle, and a server. The server includes a first inspection device configured to execute a first inspection of determining a pass or a fail for a first inspection item. Each of the first vehicle and the second vehicle includes a control device, a second inspection device, a first sensor, a second sensor, and a communication device shown below. The control device is configured to execute control to cause the vehicle to travel by autonomous driving. The second inspection device is configured to execute a second inspection of determining a pass or a fail for a second inspection item different from the first inspection item. The first sensor is configured to detect a first state corresponding to the first inspection item. The second sensor is configured to detect a second state corresponding to the second inspection item. The communication device of the first vehicle is configured to sequentially transmit the first state detected by the first sensor during autonomous driving of the first vehicle to the server. The first inspection device is configured to execute the first inspection for each of the first vehicle and the second vehicle by using the first state sequentially received from the vehicle. The second inspection device of each of the first vehicle and the second vehicle is configured to execute the second inspection by using the second state detected by the second sensor during autonomous driving of the vehicle, and to transmit a result of the second inspection to the server in a case where a fail is determined by the second inspection.

In the configuration described above, the first inspection related to the second vehicle is executed by using the first state (detection value by the first sensor of the first vehicle) sequentially transmitted from the first vehicle to the server. The detection value by the first sensor of the second vehicle is not transmitted from the second vehicle to the server, so that the amount of information transmitted from the second vehicle to the server can be reduced. With the configuration described above, it is possible to reduce the amount of information transmitted from each vehicle to the server and perform the inspections of many vehicles.

The first vehicle and the second vehicle may travel by autonomous driving at the same time. With such a configuration, conditions (weather condition and the like) that autonomous driving is executed are generally common between the first vehicle and the second vehicle, and the component of each vehicle is more likely to be deteriorated in the same tendency during autonomous driving. Therefore, it is easy for the server to appropriately execute the first inspection for the second vehicle by using the detection value by the first sensor of the first vehicle.

The first vehicle and the second vehicle may be the same vehicle model. With such a configuration, in-vehicle components are generally common between the first vehicle and the second vehicle, and the component of each vehicle is more likely to be deteriorated in the same tendency during autonomous driving. Therefore, it is easy for the server to appropriately execute the first inspection for the second vehicle by using the detection value by the first sensor of the first vehicle.

A third aspect of the present disclosure relates to a vehicle inspection method including first and second transmission steps, and first and second determination steps.

In the first transmission step, a vehicle transmits a first state detected by a first sensor mounted on the vehicle to a server, during autonomous driving. In the first determination step, the server determines a pass or a fail of the vehicle for the first inspection item by using the first state received from the vehicle. In the second determination step, the vehicle determines a pass or a fail for the second inspection item by using a second state detected by a second sensor mounted on the vehicle, during autonomous driving. In the second transmission step, the vehicle transmits a determination result of the second inspection item to the server in a case where a fail is determined for the second inspection item.

Even with the vehicle inspection method, it is possible to reduce the load on the server that manages the autonomous driving vehicle and appropriately execute the maintenance of the autonomous driving vehicle, similar to the vehicle management system described above.

According to the present disclosure, it is possible to reduce the load on the server that manages the autonomous driving vehicle and appropriately execute the maintenance of the autonomous driving vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a table showing an outline of a first inspection and a second inspection according to the embodiment of the present disclosure;

DETAILED DESCRIPTION OF EMBODIMENTS

Figure 1:
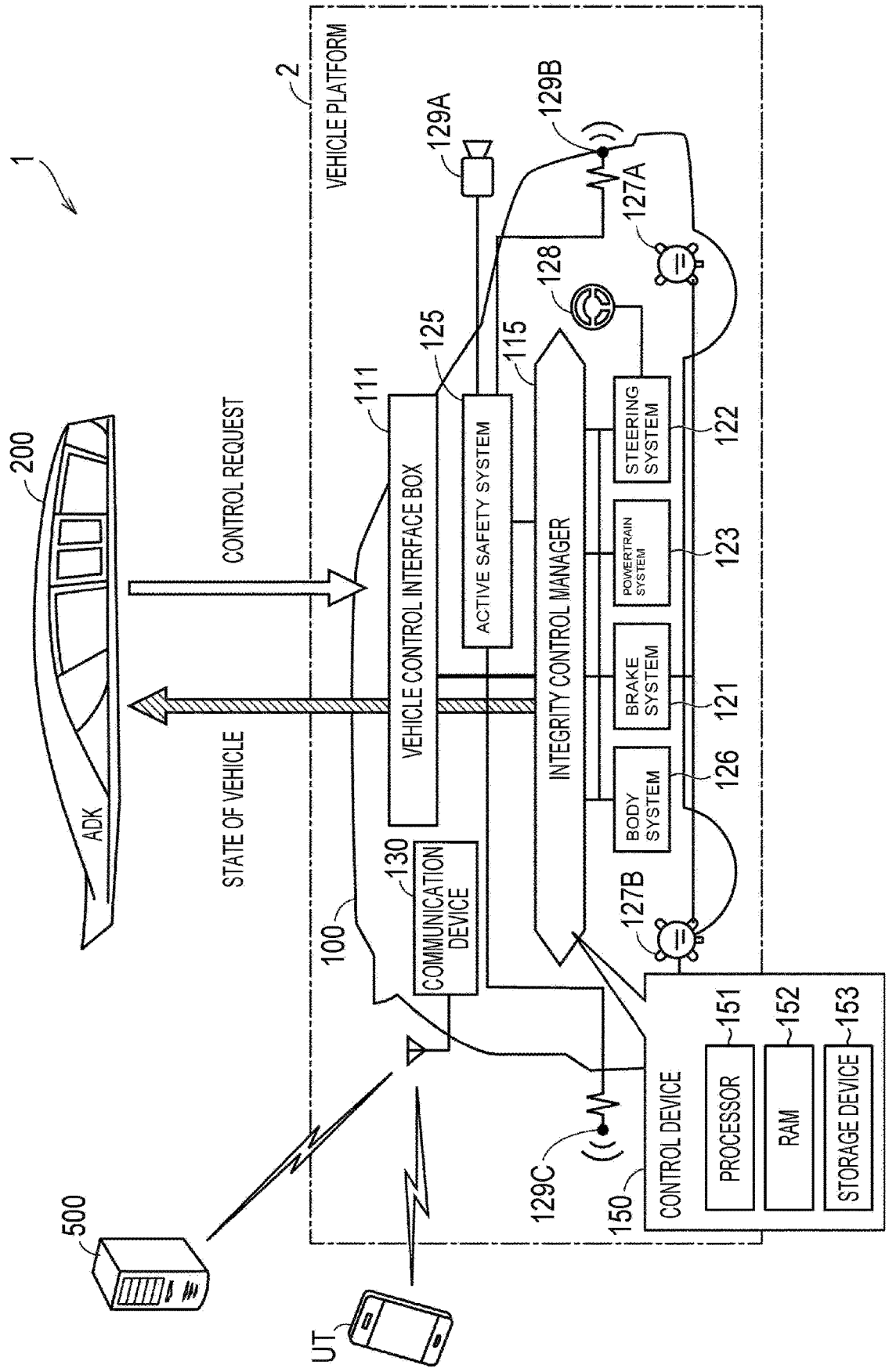
FIG. 1 is a diagram showing a schematic configuration of a vehicle according to an embodiment of the present disclosure.

In the following, an embodiment of the present disclosure will be described in detail with reference to the drawings. It should be noted that, in the drawings, the same or corresponding parts are designated by the same reference signs and the description thereof will not be repeated.

FIG. 1 is a diagram showing a schematic configuration of a vehicle according to the embodiment of the present disclosure. With reference to FIG. 1, a vehicle 1 includes an autonomous driving kit (hereinafter, referred to as "ADK") 200 and a vehicle platform (hereinafter, referred to as "VP") 2.

The VP 2 includes a control system of a base vehicle 100 and a vehicle control interface box (hereinafter, referred to as "VCIB") 111 provided in the base vehicle 100. The VCIB 111 may communicate with the ADK 200 via an in-vehicle network, such as a controller area network (CAN). It should be noted that, although the base vehicle 100 and the ADK 200 are shown at separate positions in FIG. 1, the ADK 200 is actually attached to the base vehicle 100. In the present embodiment, the ADK 200 is attached to a rooftop of the base vehicle 100. It should be noted that an attachment position of the ADK 200 can be changed as appropriate.

The base vehicle 100 is, for example, a commercially available electrified vehicle (xEV). The xEV is a vehicle that uses electric power as all or part of a power source. In the present embodiment, a battery electric vehicle (BEV) is adopted as the base vehicle 100. It should be noted that the present disclosure is not limited to this, and the base vehicle 100 may be an xEV (HEV, PHEV, FCEV, or the like) other than the BEV. The number of wheels provided in the base vehicle 100 is, for example, four. It should be noted that the number of wheels provided in the base vehicle 100 is not limited to this, and may be three or five or more.

The control system of the base vehicle 100 includes, in addition to an integrity control manager 115, various systems and various sensors for controlling the base vehicle 100. The integrity control manager 115 controls various systems related to the operation of the base vehicle 100 in an integrated manner based on signals (sensor detection signals) from various sensors provided in the base vehicle 100.

In the present embodiment, the integrity control manager 115 includes a control device 150. The control device 150 includes a processor 151, a random access memory (RAM) 152, and a storage device 153. As the processor 151, for example, a central processing unit (CPU) can be adopted. The RAM 152 functions as a working memory that transitorily stores the data processed by the processor 151. The storage device 153 is configured to store the stored information. For example, the storage device 153 includes a read only memory (ROM) and a rewritable non-volatile memory. The storage device 153 stores information used in a program (for example, a map, a mathematical formula, and various parameters), in addition to the program. In the present embodiment, the processor 151 executes the program stored in the storage device 153 to execute various vehicle controls (for example, autonomous driving control in response to an instruction from the ADK 200) and processing related to an inspection described below (see FIGS. 7 and 8). It should be noted that these pieces of processing may be executed by dedicated hardware (electronic circuit) instead of software. It should be noted that the number of processors provided in the control device 150 is optional, and the processor may be prepared for each predetermined control.

The base vehicle 100 includes a brake system 121, a steering system 122, a powertrain system 123, an active safety system 125, and a body system 126. These systems are controlled in an integrated manner by the integrity control manager 115. In the present embodiment, each system includes the computer. Moreover, the computer for each system communicates with the integrity control manager 115 via the in-vehicle network (for example, the CAN). In the following, the computer provided in each system is referred to as an "electronic control unit (ECU)".

The brake system 121 includes a braking device provided in each wheel of the base vehicle 100, and an ECU that controls the braking device. In the present embodiment, a hydraulic disc brake device is adopted as the braking device. The base vehicle 100 includes wheel speed sensors 127A, 127B. The wheel speed sensors 127A are provided in front wheels of the base vehicle 100 and detect the rotation speed of the front wheels. The wheel speed sensors 127B are provided in rear wheels of the base vehicle 100 and detect the rotation speed of the rear wheels. The ECU of the brake system 121 outputs a rotation direction and the rotation speed of each wheel detected by the wheel speed sensors 127A, 127B to the integrity control manager 115.

The steering system 122 includes a steering device of the base vehicle 100, and an ECU that controls the steering device. The steering device includes, for example, a rack and pinion type electric power steering (EPS) in which a steering angle can be adjusted by an actuator. The base vehicle 100 includes a pinion angle sensor 128. The pinion angle sensor 128 detects a rotation angle (pinion angle) of a pinion gear coupled to a rotation shaft of the actuator constituting the steering device. The ECU of the steering system 122 outputs the pinion angle detected by the pinion angle sensor 128 to the integrity control manager 115.

The powertrain system 123 includes an electric parking brake (EPB) provided in at least one of the wheels provided in the base vehicle 100, a P-Lock device provided in a transmission of the base vehicle 100, a shift device configured to select a shift range, a drive source of the base vehicle 100, and an ECU that controls each device provided in the powertrain system 123. The EPB is provided separately from the braking device described above, and puts the wheels into a fixed state by an electric actuator. For example, the P-Lock device puts a rotation position of an output shaft of the transmission into the fixed state by a parking lock pole that can be driven by the actuator. Although details will be described below, in the present embodiment, a motor that receives electric power supplied from a battery is adopted as the drive source of the base vehicle 100 (see FIG. 5). The ECU of the powertrain system 123 outputs, to the integrity control manager 115, the presence or absence of fixation by each of the EPB and the P-Lock device, the shift range selected by the shift device, and a state of each of the battery and the motor.

The active safety system 125 includes an ECU that determines the probability of collision with respect to the traveling vehicle 1. The base vehicle 100 includes a camera 129A and radar sensors 129B, 129C that detect peripheral situations including the front and rear of the vehicle 1. The ECU of the active safety system 125 determines whether or not there is the probability of collision by using the signals received from the camera 129A and the radar sensors 129B, 129C. In a case where the active safety system 125 determines that there is the probability of collision, the integrity control manager 115 outputs a braking command to the brake system 121 to increase a braking force of the vehicle 1. The base vehicle 100 according to the present embodiment includes the active safety system 125 from an initial stage (at the time of shipment). However, the present disclosure is not limited to this, and an active safety system that can be retrofitted to the base vehicle may be adopted.

The body system 126 includes body system components (for example, turn signals, a horn, and a windshield wiper), and an ECU that controls the body system components. The ECU of the body system 126 controls the body system components in response to a user operation in a manual mode, controls the body system components in response to the command received from the ADK 200 via the VCIB 111 and the integrity control manager 115 in an autonomous mode.

The vehicle 1 is configured to execute autonomous driving. The VCIB 111 functions as a vehicle control interface. In a case where the vehicle 1 travels by autonomous driving, the integrity control manager 115 and the ADK 200 exchange signals with each other via the VCIB 111, and the integrity control manager 115 executes traveling control (that is, autonomous driving control) by the autonomous mode in response to the command from the ADK 200. It should be noted that the ADK 200 can also be removed from the base vehicle 100. The base vehicle 100 can travel as a single base vehicle 100 by the user's driving even in a state in which the ADK 200 is removed. In a case where the base vehicle 100 travels as a single base vehicle 100, the control system of the base vehicle 100 executes the traveling control in the manual mode (that is, traveling control in response to the user operation).

In the present embodiment, the ADK 200 exchanges signals with the VCIB 111 in accordance with an application program interface (API) that defines each signal to be communicated. The ADK 200 is configured to process various signals defined by the API described above. For example, the ADK 200 creates a traveling plan of the vehicle 1 and outputs various commands requesting control to cause the vehicle 1 to travel in accordance with the created traveling plan to the VCIB 111 in accordance with the API described above. In the following, each of the various commands described above output from the ADK 200 to the VCIB 111 is also referred to as an "API command". In addition, the ADK 200 receives various signals indicating a state of the base vehicle 100 from the VCIB 111 in accordance with the API, and reflects the received state of the base vehicle 100 in the creation of the traveling plan. In the following, each of the various signals received by the ADK 200 from the VCIB 111 is also referred to as an "API signal". Both the API command and the API signal correspond to the signals defined in the API described above. Details of the configuration of the ADK 200 will be described below (see FIG. 2).

The VCIB 111 receives various API commands from the ADK 200. In a case where the API command is received from the ADK 200, the VCIB 111 converts the API command into a signal format that can be processed by the integrity control manager 115. In the following, the API command converted into the signal format that can be processed by the integrity control manager 115 is also referred to as a "control command". In a case where the API command is received from the ADK 200, the VCIB 111 outputs the control command corresponding to the API command to the integrity control manager 115.

The control device 150 of the integrity control manager 115 transmits various signals (for example, a sensor signal or a status signal) indicating the state of the base vehicle 100 detected in the control system of the base vehicle 100 to the ADK 200 via the VCIB 111. The VCIB 111 sequentially receives the signals indicating the state of the base vehicle 100 from the integrity control manager 115. The VCIB 111 decides a value of the API signal based on the signals received from the integrity control manager 115. In addition, the VCIB 111 also converts the signal received from the integrity control manager 115 into an API signal format, as needed. Moreover, the VCIB 111 outputs the obtained API signal to the ADK 200. The API signal indicating the state of the base vehicle 100 is sequentially output from the VCIB 111 to the ADK 200 in real time.

In the present embodiment, a less versatile signal defined by, for example, an automobile manufacturer is exchanged between the integrity control manager 115 and the VCIB 111, and a more versatile signal (for example, a signal defined by an open API) is exchanged between the ADK 200 and the VCIB 111. The VCIB 111 converts the signals between the ADK 200 and the integrity control manager 115 to allow the integrity control manager 115 to execute the vehicle control in response to the command from the ADK 200. It should be noted that the function of the VCIB 111 is not limited to the function of converting the signals described above. For example, the VCIB 111 may make a predetermined determination and transmit signals based on the determination result (for example, signals for notification, instruction, and request) to at least one of the integrity control manager 115 and the ADK 200. Details of the configuration of the VCIB 111 will be described below (see FIG. 2).

The base vehicle 100 further includes a communication device 130. The communication device 130 includes various communication interfaces (I/Fs). The control device 150 is configured to execute communication with an external device of the vehicle 1 (for example, a mobile terminal UT and a server 500 described below) via the communication device 130. The communication device 130 includes a wireless communication device (for example, a data communication module (DCM)) that can access a mobile communication network (telematics). The communication device 130 communicates with the server 500 via the mobile communication network. The wireless communicator may include a communication I/F compatible with fifth-generation mobile communication system (5G). In addition, the communication device 130 includes a communication I/F for directly communicating with the mobile terminal UT present in the vehicle or in a range around the vehicle. The communication device 130 and the mobile terminal UT may execute short-range communication, such as wireless local area network (LAN), near field communication (NFC), or Bluetooth (registered trademark).

The mobile terminal UT is a terminal carried by the user of the vehicle 1. In the present embodiment, a smartphone equipped with a touch panel display is adopted as the mobile terminal UT. It should be noted that the present disclosure is not limited to this, any mobile terminal can be adopted as the mobile terminal UT, and a laptop, a tablet terminal, a wearable device (for example, a smartwatch or smart glasses), an electronic key, or the like can also be adopted.

The vehicle 1 can be adopted as one of the components of a mobility-as-a-service (MaaS) system. The MaaS system includes, for example, a mobility service platform (MSPF). The MSPF is a unified platform to which various mobility services (for example, various mobility services provided by a ride sharing business operator, a car sharing business operator, an insurance company, a car rental business operator, a taxi business operator, and the like) are connected. The server 500 is a computer that manages and opens information for the mobility services in the MSPF. The server 500 manages various types of mobility information, and provides information (for example, the API and information on cooperation between mobility) in response to a request from the business operator. The business operator that provides the service can use various functions provided by the MSPF by using the API open on the MSPF. For example, the API needed for the development of the ADK is open on the MSPF.

Figure 2:
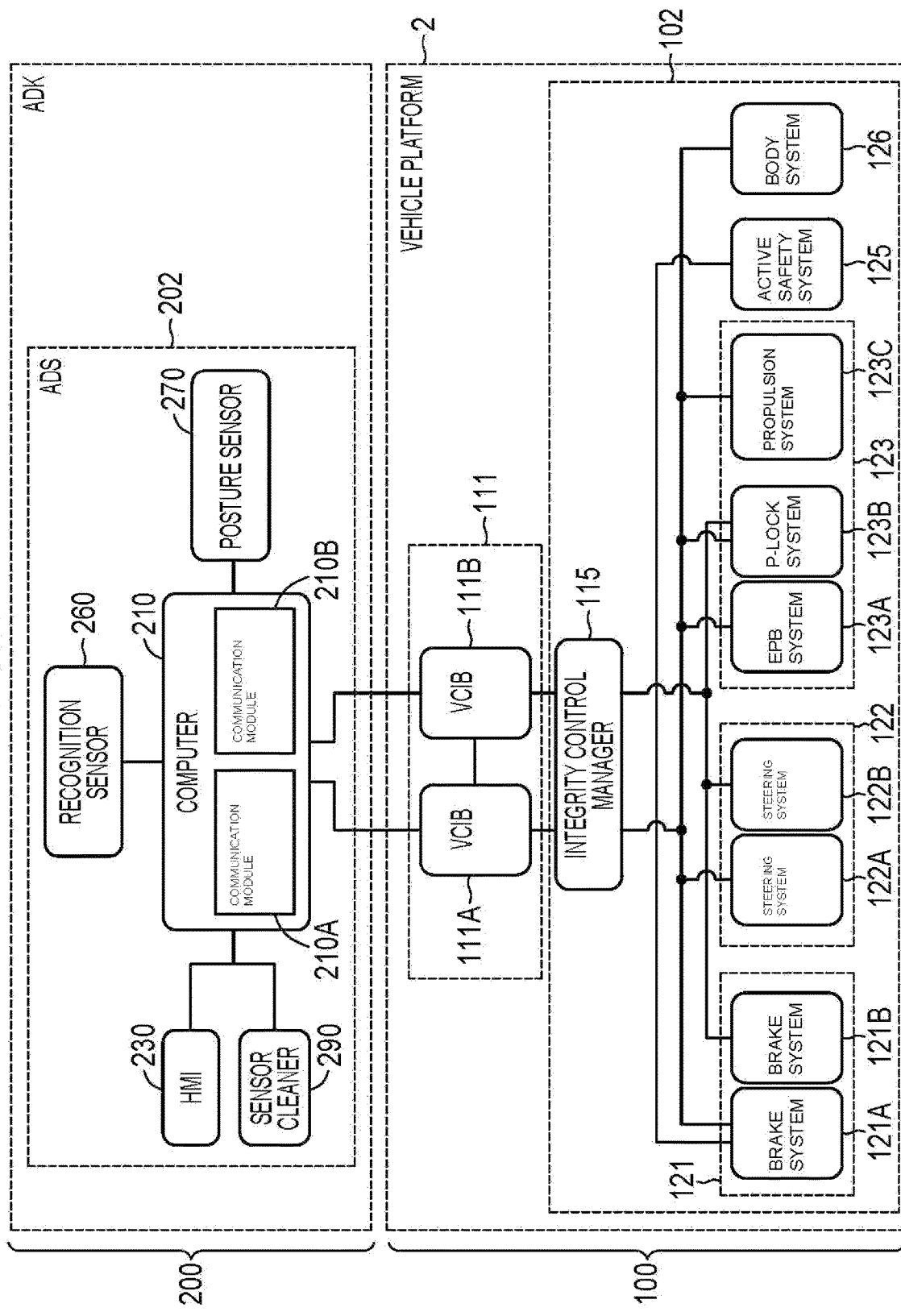
FIG. 2 is a diagram showing details of the configuration of the vehicle shown in FIG. 1.

FIG. 2 is a diagram showing details of the configuration of the vehicle 1. With reference to FIG. 2 together with FIG. 1, the ADK 200 includes an autonomous driving system (hereinafter, referred to as "ADS") 202 for executing autonomous driving of the vehicle 1. The ADS 202 includes a computer 210, a human machine interface (HMI) 230, a recognition sensor 260, a posture sensor 270, and a sensor cleaner 290.

The computer 210 includes a processor and a storage device that stores autonomous driving software using the API, and is configured to execute the autonomous driving software by the processor. The autonomous driving software executes control related to autonomous driving (see FIG. 3 described below). The autonomous driving software may be updated sequentially by over the air (OTA). The computer 210 further includes communication modules 210A, 210B.

The HMI 230 is a device for exchanging information between the user and the computer 210. The HMI 230 includes an input device and a notification device. Through the HMI 230, the user can make an instruction or a request to the computer 210 or change a value of a parameter used in the autonomous driving software (it should be noted that the change is limited to a parameter that is allowed to be changed). The HMI 230 may be a touch panel display having both functions of the input device and the notification device.

The recognition sensor 260 includes various sensors that acquire information for recognizing an external environment of the vehicle 1 (hereinafter, also referred to as "environmental information"). The recognition sensor 260 acquires the environmental information of the vehicle 1 and outputs the acquired environmental information to the computer 210. The environmental information is used for the autonomous driving control. In the present embodiment, the recognition sensor 260 includes a camera that images the surroundings (including the front and rear) of the vehicle 1 and an obstacle detector (for example, a millimeter wave radar and/or a LiDAR) that detects an obstacle by using electromagnetic waves or sound waves. For example, the computer 210 can recognize a person present in a range that can be recognized by the vehicle 1, an object (other vehicles, a pillar, a guardrail, or the like), and a line on a road (for example, a center line) by using the environmental information received from the recognition sensor 260. Artificial intelligence (AI) or an image processing processor may be used for recognition.

The posture sensor 270 acquires information related to a posture of the vehicle 1 (hereinafter, also referred to as "posture information") and outputs the acquired information to the computer 210. The posture sensor 270 includes various sensors that detect the acceleration, the angular velocity, and the position of the vehicle 1. In the present embodiment, the posture sensor 270 includes an inertial measurement unit (IMU) and a global positioning system (GPS) sensor. The IMU detects the acceleration of each of a front-rear direction, a right-left direction, and an up-down direction of the vehicle 1, and the angular velocity of each of a roll direction, a pitch direction, and a yaw direction of the vehicle 1. The GPS sensor detects the position of the vehicle 1 by using signals received from a plurality of GPS satellites. A technique of measuring the posture with high accuracy by combining the IMU and the GPS is known in a field of an automobile and an aircraft. The computer 210 may measure the posture of the vehicle 1 from the posture information described above by using, for example, such a known technique.

The sensor cleaner 290 is a device that removes dirt from the sensor (for example, the recognition sensor 260) that is exposed to the outside air outside the vehicle. For example, the sensor cleaner 290 may be configured to use a cleaning solution and the windshield wiper to clean a lens of the camera and an exit of the obstacle detector.

In the vehicle 1, in order to improve the safety, predetermined functions (for example, braking, steering, and vehicle fixing) are provided with redundancy. A control system 102 of the base vehicle 100 includes a plurality of systems that realizes equivalent functions. Specifically, the brake system 121 includes brake systems 121A, 121B. The steering system 122 includes steering systems 122A, 122B. The powertrain system 123 includes an EPB system 123A and a P-Lock system 123B. Each system includes an ECU. Even in a case where the abnormality occurs in one of the systems that realize the equivalent functions, the other of the systems is operated normally, so that the function works normally in the vehicle 1.

The VCIB 111 includes a VCIB 111A and a VCIB 111B. Each of the VCIBs 111A, 111B includes a computer. The communication modules 210A, 210B of the computer 210 are configured to communicate with the computers of the VCIB s 111A, 111B, respectively. The VCIB 111A and the VCIB 111B are connected to each other to be communicable with each other. Each of the VCIBs 111A, 111B can be operated independently, and even in a case where the abnormality occurs in one of the VCIBs 111A, 111B, the other of the VCIBs 111A, 111B is operated normally, so that the VCIB 111 is operated normally. Both the VCIBs 111A, 111B are connected to each of the systems described above via the integrity control manager 115. It should be noted that, as shown in FIG. 2, connection destinations of the VCIB 111A and the VCIB 111B are partially different.

In the present embodiment, a function of accelerating the vehicle 1 is not provided with redundancy. The powertrain system 123 includes a propulsion system 123C as a system for accelerating the vehicle 1.

The vehicle 1 is configured to switch between the autonomous mode and the manual mode. The API signal received by the ADK 200 from the VCIB 111 includes a signal indicating whether the vehicle 1 is in the autonomous mode or the manual mode (hereinafter, referred to as "autonomous state"). The user can select any of the autonomous mode and the manual mode through a predetermined input device (for example, the HMI 230 or the mobile terminal UT). In a case where any of the driving modes is selected by the user, the vehicle 1 is set to the selected driving mode, and the selection result is reflected in the autonomous state. It should be noted that, in a case where the vehicle 1 is not in a state in which autonomous driving can be executed, the driving mode does not shift to the autonomous mode even when the user selects the autonomous mode. Switching of the driving modes of the vehicle 1 may be executed by the integrity control manager 115. The integrity control manager 115 may switch between the autonomous mode and the manual mode in accordance with a situation of the vehicle 1.

In a case where the vehicle 1 is in the autonomous mode, the computer 210 acquires a state of the vehicle 1 from the VP 2 and sets a next operation of the vehicle 1 (for example, acceleration, deceleration, and turning). Moreover, the computer 210 outputs various commands for realizing the next set operation of the vehicle 1. In a case where the computer 210 executes the API software (that is, the autonomous driving software using the API), the command related to the autonomous driving control is transmitted from the ADK 200 to the integrity control manager 115 through the VCIB 111.

Figure 3:
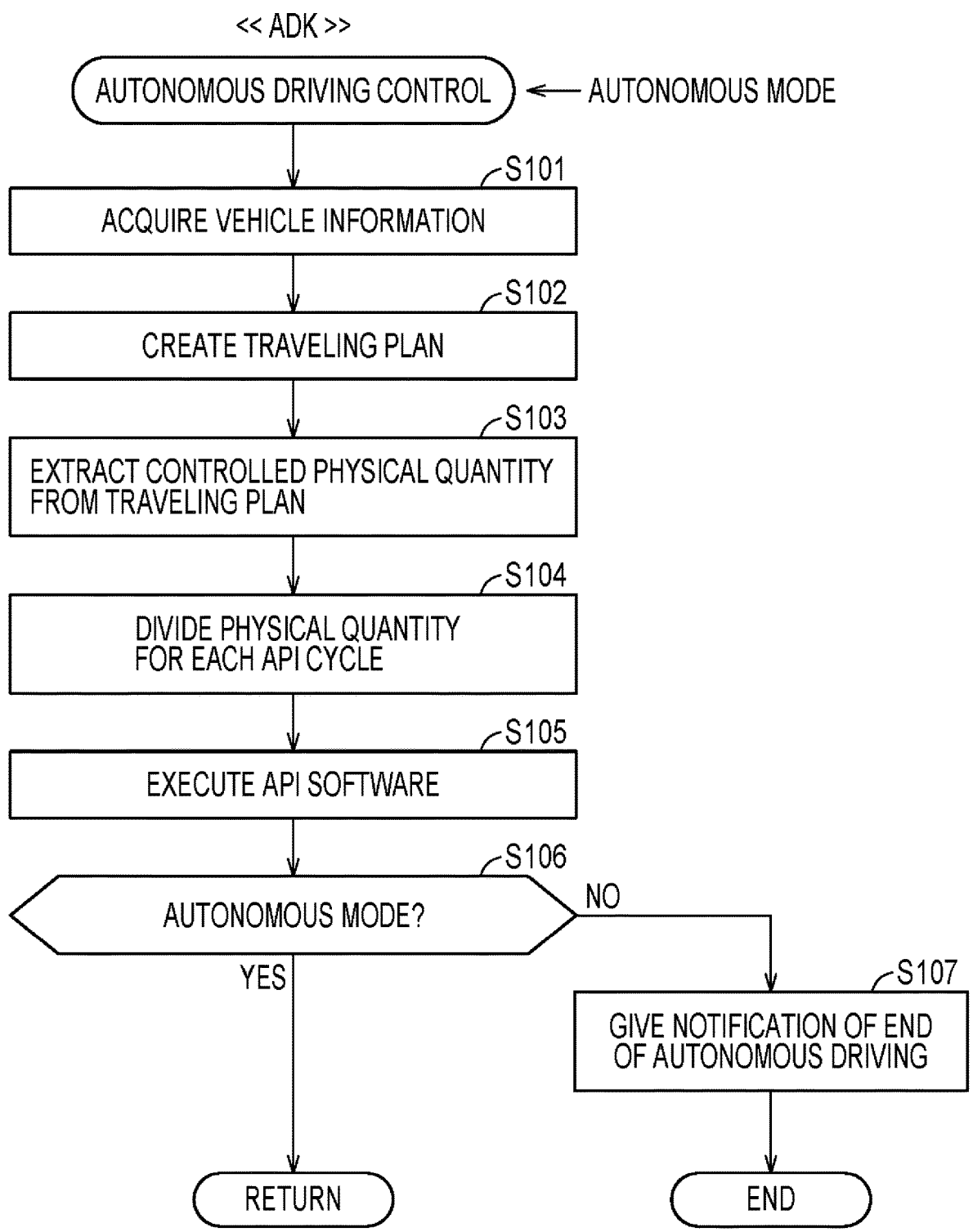
FIG. 3 is a flowchart showing a processing procedure of autonomous driving control according to the embodiment of the present disclosure.

FIG. 3 is a flowchart showing processing executed by the ADK 200 in the autonomous driving control according to the present embodiment. The processing shown in this flowchart is repeatedly executed in a cycle corresponding to the API (API cycle) in a case where the vehicle 1 is in the autonomous mode. In a case where the driving mode of the vehicle 1 is switched from the manual mode to the autonomous mode, a start signal indicating the start of autonomous driving is transmitted from the vehicle 1 (communication device 130) to the server 500 together with the identification information of the vehicle 1, and a series of processing shown in FIG. 3 described below is started. In the following, each step in the flowchart is simply referred to as "S".

With reference to FIG. 3 together with FIGS. 1 and 2, in S101, the computer 210 acquires the current information of the vehicle 1. For example, the computer 210 acquires the environmental information and the posture information of the vehicle 1 from the recognition sensor 260 and the posture sensor 270. Further, the computer 210 acquires the API signal. In the present embodiment, the API signal indicating the state of the vehicle 1 is sequentially output from the VCIB 111 to the ADK 200 in real time regardless of whether the vehicle 1 is in any of the autonomous mode and the manual mode. In order to improve the accuracy of the autonomous driving control, the state of the vehicle 1 may be sequentially transmitted from the integrity control manager 115 to the ADK 200 in a shorter cycle in the autonomous mode than in the manual mode. The API signal acquired by the computer 210 includes, in addition to the autonomous state described above, signals indicating the rotation direction and the rotation speed of each wheel detected by the wheel speed sensors 127A, 127B.

In S102, the computer 210 creates the traveling plan based on the information of the vehicle 1 acquired in S101. For example, the computer 210 calculates the behavior of the vehicle 1 (for example, the posture of the vehicle 1) and creates the traveling plan suitable for the state of the vehicle 1 and the external environment. The traveling plan is data indicating the behavior of the vehicle 1 in a predetermined period. In a case where the traveling plan is already present, the traveling plan may be amended in S102.

In S103, the computer 210 extracts a controlled physical quantity (acceleration, tire turning angle, or the like) from the traveling plan created in S102. In S104, the computer 210 divides the physical quantity extracted in S103 for each API cycle. In S105, the computer 210 executes the API software by using the physical quantity divided in S104. By executing the API software in this way, the API command (propulsion direction command, propulsion command, braking command, vehicle fixing command, or the like) requesting control to realize the physical quantity in accordance with the traveling plan is transmitted from the ADK 200 to the VCIB 111. The VCIB 111 transmits the control command corresponding to the received API command to the integrity control manager 115, and the integrity control manager 115 executes the autonomous driving control of the vehicle 1 in response to the control command. The state of the vehicle 1 during autonomous driving is sequentially recorded in the storage device of the computer 210.

In following S106, the computer 210 determines whether or not the vehicle 1 is in the autonomous mode. While the autonomous mode is maintained (YES in S106), autonomous driving of the vehicle 1 is executed by repeatedly executing the processing of S101 to S105. On the other hand, in a case where the vehicle 1 is in the manual mode (NO in S106), in S107, an end signal indicating the end of autonomous driving is transmitted from the vehicle 1 (communication device 130) to the server 500 together with the identification information of the vehicle 1, and then the series of processing shown in FIG. 3 ends. In the present embodiment, the computer 210, the VCIB 111, and the integrity control manager 115 cooperate to execute control to cause the vehicle 1 to travel by autonomous driving. Each of the computer 210, the VCIB 111 (more specifically, the computer provided in the VCIB 111), and the integrity control manager 115 (more specifically, the control device 150) corresponds to an example of a "control device" according to the present disclosure. In the present embodiment, it is assumed that autonomous driving of the vehicle 1 is executed in a case where the vehicle 1 is in a manned state. However, the present disclosure is not limited to this, and autonomous driving of the vehicle 1 may be executed in a case where the vehicle 1 is in an unmanned state. The autonomous driving control is not limited to the control shown in FIG. 3, and other controls (known autonomous driving control) may be adopted.

In the present embodiment, the server 500 executes a first inspection of determining a pass or a fail for a first inspection item. In addition, the control device 150 mounted on the vehicle 1 executes a second inspection of determining a pass or a fail for a second inspection item different from the first inspection item. In the server 500, an example of a "first inspection device" according to the present disclosure is realized by a processor (processor 501 described below) and a program executed by the processor. In addition, in the control device 150, an example of a "second inspection device" according to the present disclosure is realized by the processor 151 and the program executed by the processor 151.

FIG. 4 is a table showing an outline of the first inspection and the second inspection according to the present embodiment. With reference to FIG. 4, regarding the first inspection and the second inspection according to the present embodiment, requested real-time performance is higher in the second inspection item than in the first inspection item. That is, the requested monitoring interval and determination interval are shorter in the second inspection item than in the first inspection item. Specifically, the first inspection item is an item for checking the presence or absence of the component abnormality caused by aging deterioration. The second inspection item is an item for checking the presence or absence of the air leak of the tire.

In the present embodiment, the server 500 executes the first inspection based on the first state corresponding to the first inspection item. Although the details will be described below, the first state is detected by a first sensor provided in the vehicle 1 during autonomous driving of the vehicle 1, and is sequentially transmitted from the vehicle 1 to the server 500. The server 500 remotely executes the inspection of the vehicle 1. In a vehicle inspection method according to the present embodiment, the first state includes weight of the vehicle 1, a vehicle speed of the vehicle 1, the number of stops of the vehicle 1, the number of times of sudden braking of the vehicle 1, the position of the vehicle 1, and an SOC of the power storage device (battery 160 shown in FIG. 5 described below) mounted on the vehicle 1. A relationship between the first state and the aging deterioration (first inspection item) of various in-vehicle components will be described below.

In the present embodiment, the control device 150 mounted on the vehicle 1 executes the second inspection based on the second state corresponding to the second inspection item. Although the details will be described below, the second state is detected by a second sensor provided in the vehicle 1 during autonomous driving of the vehicle 1. In the present embodiment, an air pressure of the tire is adopted as the second state. In a case where the air leak of the tire occurs, the air pressure of the tire is decreased. In a case of the slow leak, the air pressure of the tire is gradually decreased. The control device 150 can determine whether or not the air leak of the tire occurs based on the transition of the air pressure of the tire.

Figure 5:
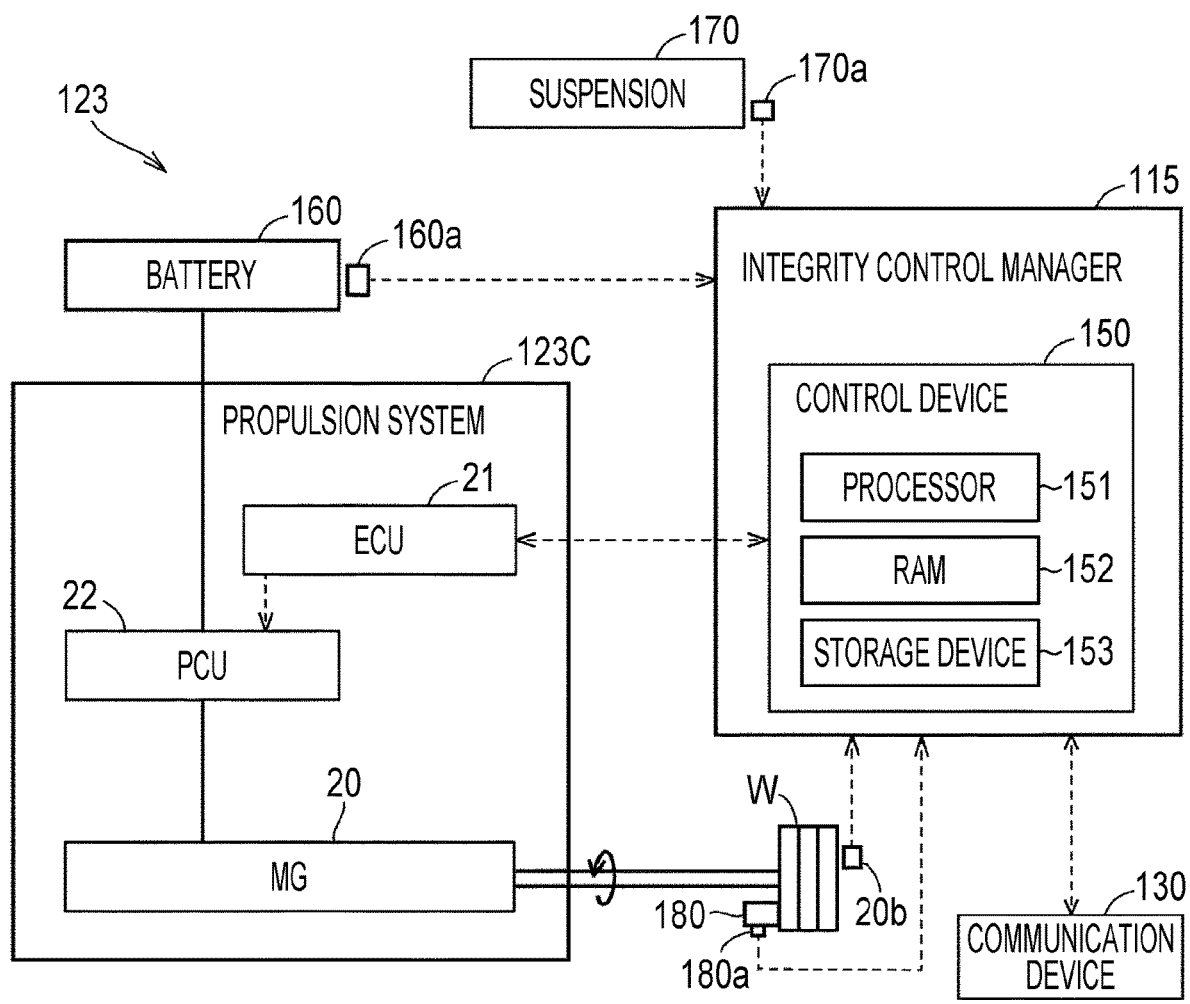
FIG. 5 is a diagram for describing a first sensor and a second sensor provided in the vehicle according to the embodiment of the present disclosure.

FIG. 5 is a diagram for describing the first sensor and the second sensor provided in the vehicle 1. With reference to FIG. 5 together with FIGS. 1 and 2, the vehicle 1 includes the battery 160 that supplies the electric power to the propulsion system 123C. As the battery 160, a known vehicle power storage device (for example, a liquid secondary battery, an all-solid-state secondary battery, or an assembled battery) can be adopted. Examples of the vehicle secondary battery include a lithium ion battery and a nickel-metal hydride battery.

The battery 160 includes a monitoring module 160a. The monitoring module 160a includes various sensors that detect a state of the battery 160 (for example, a voltage, a current, and a temperature), and outputs the detection result to the integrity control manager 115. The monitoring module 160a may be a battery management system (BMS) further having a state-of-charge (SOC) estimation function in addition to the sensor function. The control device 150 can acquire the state of the battery 160 (for example, the temperature, the current, the voltage, and the SOC) based on the output of the monitoring module 160a. The SOC indicates a remaining power storage amount, and for example, a ratio of a current power storage amount to a power storage amount in a fully charged state is represented by 0% to 100%.

The vehicle 1 further includes a weight sensor 170a that detects the weight of the vehicle 1. The weight of the vehicle 1 detected by the weight sensor 170a is total weight obtained by adding weight of a person who gets on the vehicle 1 and weight of an object loaded on the vehicle 1 to weight of a vehicle body. In the present embodiment, a loading capacity sensor attached to a suspension 170 provided in the base vehicle 100 is adopted as the weight sensor 170a. It should be noted that the present disclosure is not limited to this, and a pressure sensor provided in each seat in the base vehicle 100 may be adopted as the weight sensor 170a instead of or in addition to the loading capacity sensor. The weight of the vehicle 1 detected by the weight sensor 170a is output to the integrity control manager 115.

The propulsion system 123C includes a motor generator (MG) 20, an ECU 21, and a power control unit (PCU) 22. The propulsion system 123C generates a traveling driving force of the vehicle 1 by using the electric power stored in the battery 160. For example, the MG 20 is a three-phase alternating current motor generator. The PCU 22 includes, for example, an inverter, a converter, and a relay (hereinafter, referred to as a "system main relay (SMR)"). The PCU 22 is controlled by the ECU 21. The SMR is configured to switch connection/disconnection of a power path from the battery 160 to the MG 20. The SMR is put into a closed state (connected state) when the vehicle 1 travels.

The MG 20 is driven by the PCU 22 and rotates a drive wheel W of the vehicle 1. In addition, the MG 20 executes regenerative power generation, and supply the generated electric power to the battery 160. The PCU 22 drives the MG 20 by using the electric power supplied from the battery 160. The number of traveling motors (MGs 20) provided in the vehicle 1 is optional, and may be one, two, or three or more. The traveling motor may be an in-wheel motor. Although solely one drive wheel W is schematically shown in FIG. 5, the number of the drive wheels W and a drive method in the vehicle 1 are optional. The drive method of the vehicle 1 may be any of front-wheel drive, rear-wheel drive, and four-wheel drive.

Each wheel (including the drive wheel W) provided in the vehicle 1 includes an air pressure sensor 20b that detects the air pressure of the tire of the wheel, a braking device 180 provided in the brake system 121, and a brake sensor 180a that detects the braking force applied to the wheel by the braking device 180. The air pressure sensor 20b may be a tire pressure monitoring system (TPMS) that monitors a temperature of the tire as well as the air pressure of the tire. The brake sensor 180a may be a hydraulic sensor that detects a hydraulic pressure applied to a brake pad (or a wheel cylinder). The air pressure of the tire and the braking force (for example, the hydraulic pressure corresponding to the braking force) for each wheel detected by the four air pressure sensors 20b and the four brake sensors 180a are output to the integrity control manager 115.

In the present embodiment, each of the wheel speed sensors 127A, 127B (FIG. 1), the posture sensor 270 (FIG. 2), the monitoring module 160a (FIG. 5), the weight sensor 170a (FIG. 5), and the brake sensor 180a (FIG. 5) functions as the first sensor. The communication device 130 sequentially transmits the first state detected by the first sensor during autonomous driving of the vehicle 1 to the server 500.

In the present embodiment, each of the four air pressure sensors 20b functions as the second sensor. The control device 150 executes the second inspection by using the second state (air pressure of the tire) detected by the second sensor (air pressure sensor 20b) during autonomous driving of the vehicle 1. Moreover, in a case where a fail is determined by the second inspection, the communication device 130 transmits a signal indicating the result of the second inspection to the server 500.

Figure 6:
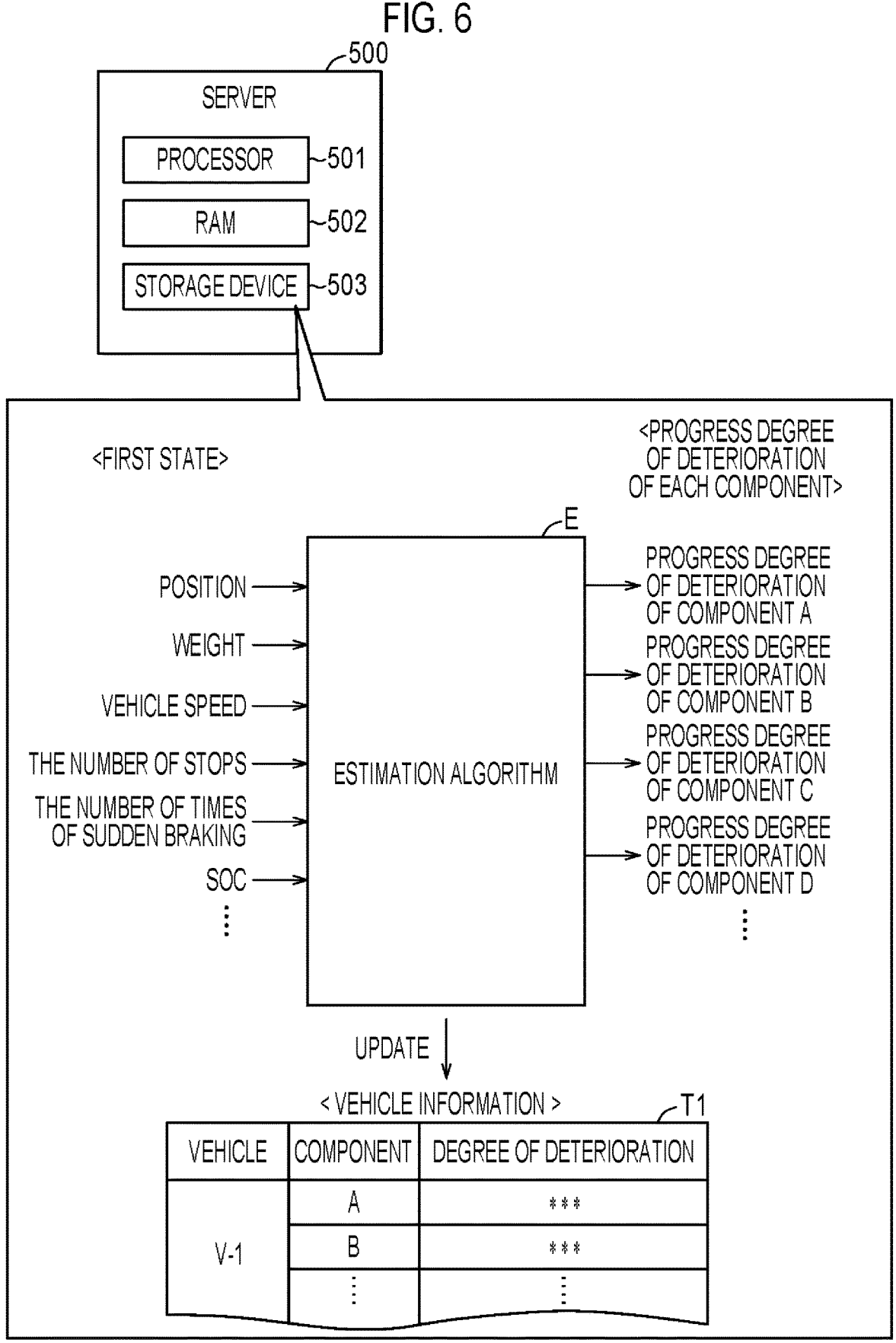
FIG. 6 is a diagram for describing a configuration of a server according to the embodiment of the present disclosure.

FIG. 6 is a diagram for describing a configuration of the server 500. With reference to FIG. 6 together with FIGS. 1 and 2, the server 500 includes the processor 501, a RAM 502, and a storage device 503. The storage device 503 is configured to store the stored information. The storage device 503 stores information used in a program (for example, a map, a mathematical formula, and various parameters), in addition to the program. In the present embodiment, the processor 501 executes the program stored in the storage device 503, so that processing related to the inspection described below (see FIGS. 9 and 10) is executed. It should be noted that such processing may be executed by dedicated hardware (electronic circuit) instead of software.

The storage device 503 further stores an estimation algorithm E. The estimation algorithm E defines a relationship between predetermined input information and predetermined output information. In a case where the predetermined input information is input to the estimation algorithm E, the estimation algorithm E outputs the predetermined output information in accordance with the relationship described above.

In the present embodiment, the first state described above, that is, the weight of the vehicle 1, the vehicle speed of the vehicle 1, the number of stops of the vehicle 1, the number of times of sudden braking of the vehicle 1, the position of the vehicle 1, and the SOC of the battery 160 correspond to the input information described above of the estimation algorithm E. Each of the vehicle speed and the number of stops of the vehicle 1 is detected by, for example, the wheel speed sensors 127A, 127B. In addition, the weight of the vehicle 1, the number of times of sudden braking of the vehicle 1, the position of the vehicle 1, and the SOC of the battery 160 are detected by the weight sensor 170a, the brake sensor 180a, the posture sensor 270, and the monitoring module 160a, respectively.

In the present embodiment, a progress degree of deterioration of a predetermined target component (for example, a component A, a component B, a component C, a component D, . . . ) mounted on the vehicle 1 corresponds to the output information described above of the estimation algorithm E. Specifically, in a case where the first state is input to the estimation algorithm E, the degree to which the deterioration of the target component has progressed by the vehicle 1 executing autonomous driving in the first state (the progress degree of deterioration of the target component) is output from the estimation algorithm E.

In the present embodiment, each of the MG 20 (drive motor), the battery 160 (drive battery), the suspension 170, and the braking device 180 mounted on the vehicle 1 is adopted as the target component. Specifically, as the weight of the vehicle 1 during autonomous driving is heavier, the deterioration of each of the MG 20, the suspension 170, and the braking device 180 is more likely to progress. As the number of times of sudden braking (integrated number of times) of the vehicle 1 is larger, the deterioration of each of the suspension 170 and the braking device 180 is more likely to progress. As a time when the SOC of the battery 160 is out of a suitable range is longer, the deterioration of the battery 160 is more likely to progress. As the number of stops (integrated number of times) of the vehicle 1 is larger, the deterioration of the braking device 180 is more likely to progress. In addition, since the vehicle 1 that continues to travel departs after the vehicle has stopped, as the number of stops of the vehicle 1 is larger, the number of times the vehicle 1 starts is larger, and the deterioration of the MG 20 is more likely to progress.

The input information of the estimation algorithm E may further include weather information (information indicating the weather in a region in which the vehicle 1 is present), traffic information (information indicating a traffic situation of surroundings of the vehicle 1), and road surface information (information indicating a road surface on which the vehicle 1 is traveling) that are acquired based on positional information of the vehicle 1. Examples of the weather information include air temperature, weather (for example, sunny, cloudy, rainy, or snowy). Examples of the traffic information include congestion information. Examples of the road surface information include a type of the road surface, such as flat, an uphill, a downhill, or a rough road. As a time when the air temperature (or road surface temperature) is out of a suitable range is longer, a rubber product (for example, tire) is more likely to be deteriorated. In addition, the rubber product can also be deteriorated by sunlight. In a case where the vehicle 1 travels on a congested road, each of the MG 20 and the braking device 180 is more likely to be deteriorated. In a case where the vehicle 1 travels on the uphill, the MG 20 is more likely to be deteriorated. In a case where the vehicle 1 travels on the downhill, the braking device 180 is more likely to be deteriorated. In a case where the vehicle 1 travels on the rough road, the suspension 170 is more likely to be deteriorated.

In the present embodiment, an artificial intelligence (AI) algorithm is adopted as the estimation algorithm E. The estimation algorithm E may be a trained model trained through machine learning using big data (for example, data actually measured in a vehicle having the same specifications as the vehicle 1). It should be noted that the present disclosure is not limited to this, and the estimation algorithm E may be a rule-based algorithm. The estimation algorithm E may be, for example, a mathematical formula or a map indicating the relationship (tendency) described above. The estimation algorithm E may be sequentially updated by the OTA.

The server 500 manages information related to the vehicle (hereinafter, also referred to as "vehicle information"). The vehicle information of each of a plurality of vehicles is stored in the storage device 503 of the server 500. Specifically, the identification information (vehicle ID) for identifying the vehicle is applied to each vehicle, and the server 500 manages the vehicle information by distinguishing the vehicle information using the vehicle ID. The vehicle information includes, for example, a vehicle model, a specification, and a vehicle situation (for example, whether or not the vehicle is during autonomous driving). In the present embodiment, the vehicle information further includes a degree of deterioration of each target component. Table T1 in FIG. 6 shows the vehicle information of each vehicle. In Table T1, "V-1" corresponds to the vehicle ID of the vehicle 1. FIG. 6 shows solely the vehicle information related to the vehicle 1 (V-1) (particularly, the degree of deterioration of each target component), but Table T1 shows the vehicle information related to all the vehicles registered in the server 500.

The server 500 sequentially inputs the first state sequentially received from the vehicle 1 during autonomous driving to the estimation algorithm E, and sequentially adds the progress degree of deterioration of each target component output from the estimation algorithm E to the degree of deterioration of each target component shown in Table T1. The progress degree of deterioration of each target component during autonomous driving is estimated by the estimation algorithm E and added to the degree of deterioration of the corresponding target component in Table T1. As a result, Table T1 is updated. The server 500 can acquire the progress degree of deterioration of each target component during autonomous driving of the vehicle 1 by integrating the progress degree of deterioration of each target component output from the estimation algorithm E. It should be noted that the method of estimating the progress degree of deterioration of each target component at a time other than during autonomous driving is optional. The server 500 may estimate the progress degree of deterioration of each target component at the time other than during autonomous driving, for example, by using a predetermined map.

The control device 150 is configured to execute autonomous driving of the vehicle 1 for a predetermined period (hereinafter, referred to as "operation period"). During autonomous driving of the vehicle 1, the processing shown in FIG. 3 is executed, and the control device 150 controls various systems (for example, the brake system 121, the steering system 122, the powertrain system 123, the active safety system 125, and the body system 126 shown in FIG. 2) of the vehicle 1 in response to the command from the ADK 200. The vehicle 1 may provide a predetermined service (for example, a physical distribution service or a passenger transportation service) by autonomous driving during the operation period. In the present embodiment, the vehicle 1 that provides the passenger transportation service by autonomous driving travels to go around a service region on a predetermined route. It should be noted that the present disclosure is not limited to this, and the vehicle 1 may decide a route in accordance with each request and execute traveling by autonomous driving in accordance with the decided route (on-demand route).

Figure 7:
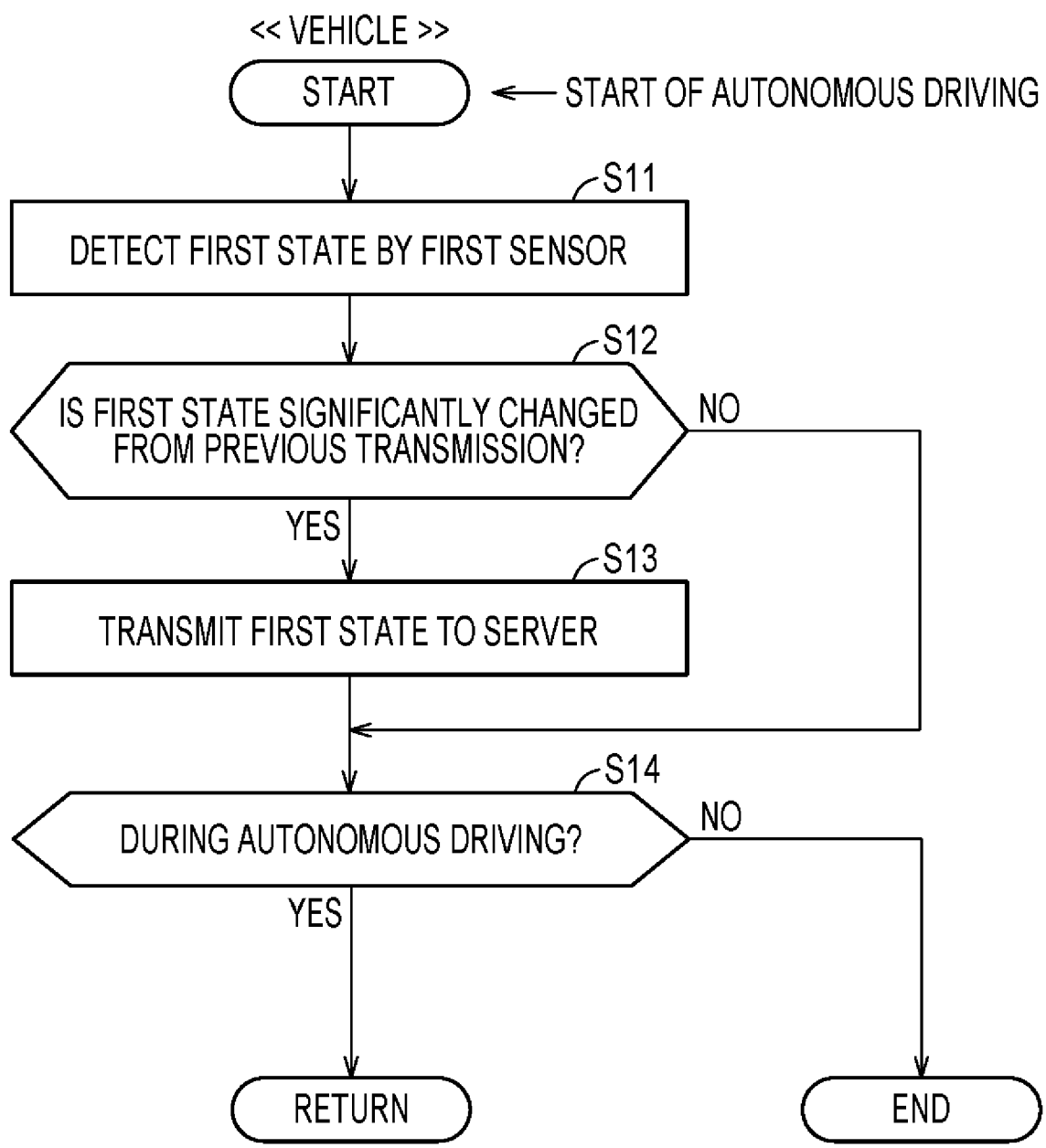
FIG. 7 is a flowchart showing processing related to the first inspection executed by a control device of the vehicle according to the embodiment of the present disclosure.

FIG. 7 is a flowchart showing processing related to the first inspection executed by the control device 150 of the vehicle 1. For example, in a case where autonomous driving by the vehicle 1 is started, a series of processing shown in FIG. 7 is started, and the series of processing shown in FIG. 7 is repeatedly executed in a predetermined first cycle during autonomous driving. The control device 150 determines that the autonomous driving by the vehicle 1 is started, for example, in a case where the driving mode of the vehicle 1 is switched from the manual mode to the autonomous mode.

With reference to FIG. 7 together with FIGS. 1 to 6, in S11, the control device 150 acquires the current first state (more specifically, the weight of the vehicle 1, the vehicle speed of the vehicle 1, the number of stops of the vehicle 1, the number of times of sudden braking of the vehicle 1, the position of the vehicle 1, and the SOC of the battery 160) detected by the first sensor, and stores the acquired current first state in the storage device 153.

In following S12, the control device 150 determines whether or not at least one of the first states acquired in S11 is significantly changed from the previous transmission (S13 described below). Specifically, the control device 150 determines whether or not a degree of deviation between the first state detected in S11 and the first state that is most recently transmitted to the server 500 (hereinafter, also referred to as "state change amount") exceeds a predetermined level. The degree of deviation (state change amount) between the previous value (most recently transmitted value) and the current value (current sensor detection value) can be represented by, for example, a difference or a ratio. As the difference (absolute value) is larger, the state change amount is larger. In addition, as the ratio is closer to one, the state change amount is smaller. The predetermined level can be optionally set for each first state.

The control device 150 determines whether or not the state change amount exceeds the predetermined level for each first state, determines YES in S12 in a case where the state change amount of at least one first state exceeds the predetermined level, and determines NO in S12 in a case where the state change amount of any of the first states does not exceed the predetermined level. In an initial processing routine (processing routine immediately after the vehicle 1 starts autonomous driving), since the previous value is not present, YES is determined in S12.

In a case where YES is determined in S12, the communication device 130 transmits a signal indicating all the first states acquired in S11 (hereinafter, also referred to as a "first inspection signal") in S13 to the server 500 together with the vehicle ID of the vehicle 1. Thereafter, the processing proceeds to S14. On the other hand, in a case where NO is determined in S12, the processing proceeds to S14 without transmitting the first inspection signal (S13).

In following S14, the control device 150 determines whether or not the vehicle 1 is during autonomous driving. For example, the control device 150 determines that the vehicle 1 is during autonomous driving in a case where the vehicle 1 is in the autonomous mode, and the control device 150 determines that the vehicle 1 is not during autonomous driving in a case where the vehicle 1 is in the manual mode. In a case where the vehicle 1 is during autonomous driving (YES in S14), the processing returns to the first step (S11). In a case where the vehicle 1 is not during autonomous driving (NO in S14), the series of processing shown in FIG. 7 ends.

As described above, the vehicle 1 (communication device 130) is configured to sequentially transmit the first state detected by the first sensor during autonomous driving of the vehicle 1 to the server 500. In the present embodiment, the first inspection signal indicating the first state detected by the first sensor is sequentially transmitted from the vehicle 1 to the server 500 in S13 of FIG. 7.

Figure 8:
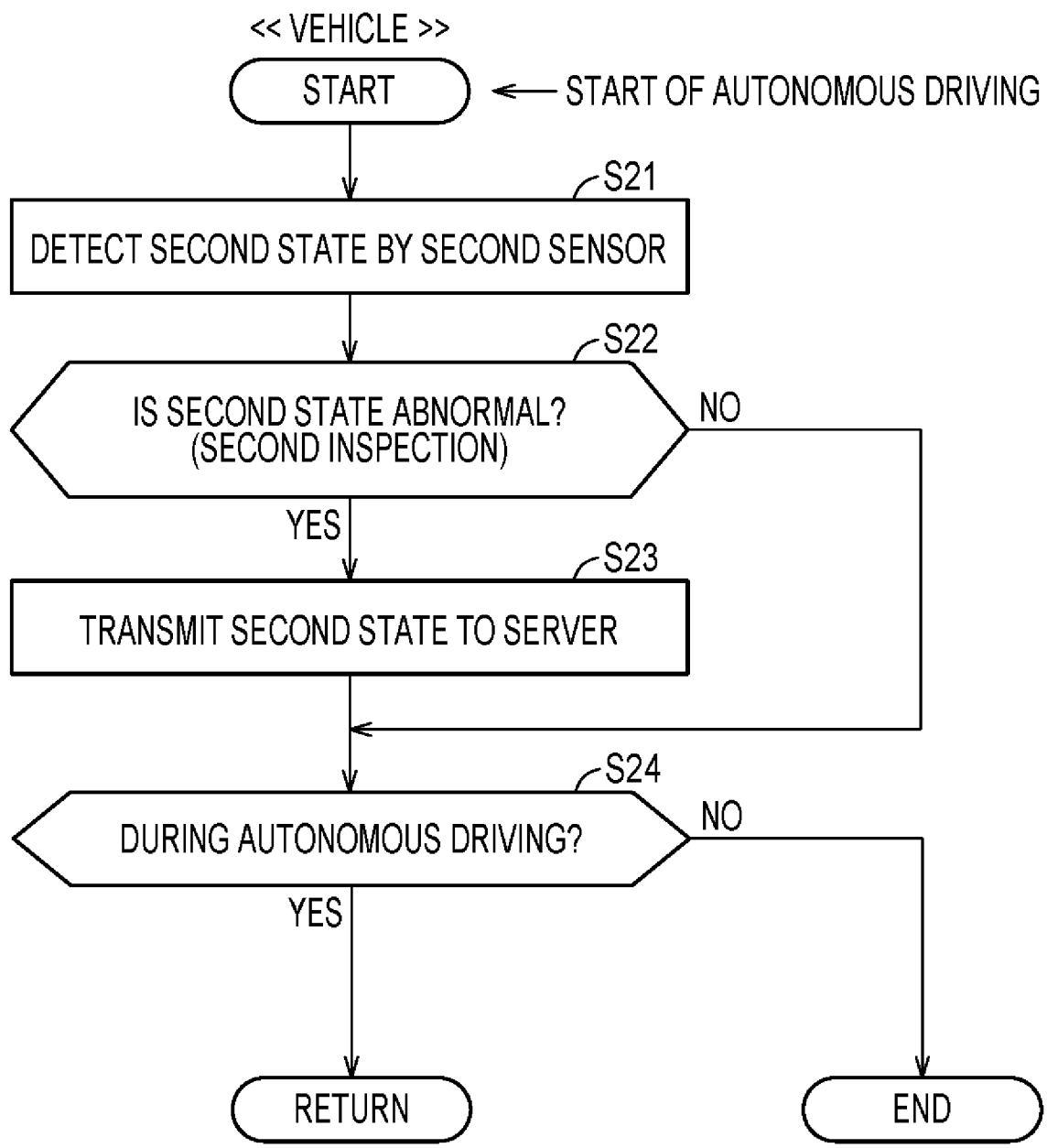
FIG. 8 is a flowchart showing processing related to the second inspection executed by the control device of the vehicle according to the embodiment of the present disclosure.

FIG. 8 is a flowchart showing processing related to the second inspection executed by the control device 150 of the vehicle 1. For example, in a case where autonomous driving by the vehicle 1 is started, a series of processing shown in FIG. 8 is started, and the series of processing shown in FIG. 8 is repeatedly executed in a predetermined second cycle during autonomous driving. In order to enhance the real-time performance of the second inspection, the second cycle (execution cycle of the second inspection) may be shorter than the first cycle (detection cycle of the first state).

With reference to FIG. 8 together with FIGS. 1 to 6, in S21, the control device 150 acquires the current second state (air pressure of the tire) detected by the second sensor (air pressure sensor 20b), and stores the acquired current second state in the storage device 153. Subsequently, the control device 150 executes the second inspection in S22 by using the second state acquired in S21. In the second inspection, the control device 150 determines whether or not the abnormality occurs in the second state. Specifically, the control device 150 determines whether or not the air leak of the tire occurs for each wheel of the vehicle 1 based on the transition of the air pressure of the tire. The occurrence of the air leak of the tire means that the abnormality occurs in the air pressure of the tire (second state). The control device 150 may determine that the air leak of the tire occurs in a case where a decrease in the air pressure of the tire exceeding a reference level is checked in S22 for a predetermined continuous number of times.

In a case where the air leak of the tire occurs in at least one wheel in the vehicle 1, a fail is determined by the second inspection (YES in S22), and the processing proceeds to S23. In S23, the communication device 130 transmits a signal indicating the result of the second inspection (abnormality of the air pressure of the tire) (hereinafter, also referred to as a "second inspection signal") to the server 500 together with the vehicle ID of the vehicle 1. Thereafter, the processing proceeds to S24. On the other hand, in a case where the air leak of the tire does not occur in all the wheels of the vehicle 1, a pass is determined by the second inspection (NO in S22), the second inspection signal is not transmitted (S23), and the processing proceeds to S24.

In following S24, the control device 150 determines whether or not the vehicle 1 is during autonomous driving, as in the case of S14 in FIG. 7 described above. Moreover, in a case where the vehicle 1 is during autonomous driving (YES in S24), the processing returns to the first step (S21). In a case where the vehicle 1 is not during autonomous driving (NO in S24), the series of processing shown in FIG. 8 ends.

As described above, the control device 150 executes the second inspection by using the second state detected by the second sensor during autonomous driving of the vehicle 1 (S21 and S22), and the communication device 130 transmits the second inspection signal (signal indicating the result of the second inspection) to the server 500 in a case where a fail is determined by the second inspection (YES in S22) (S23).

Figure 9:
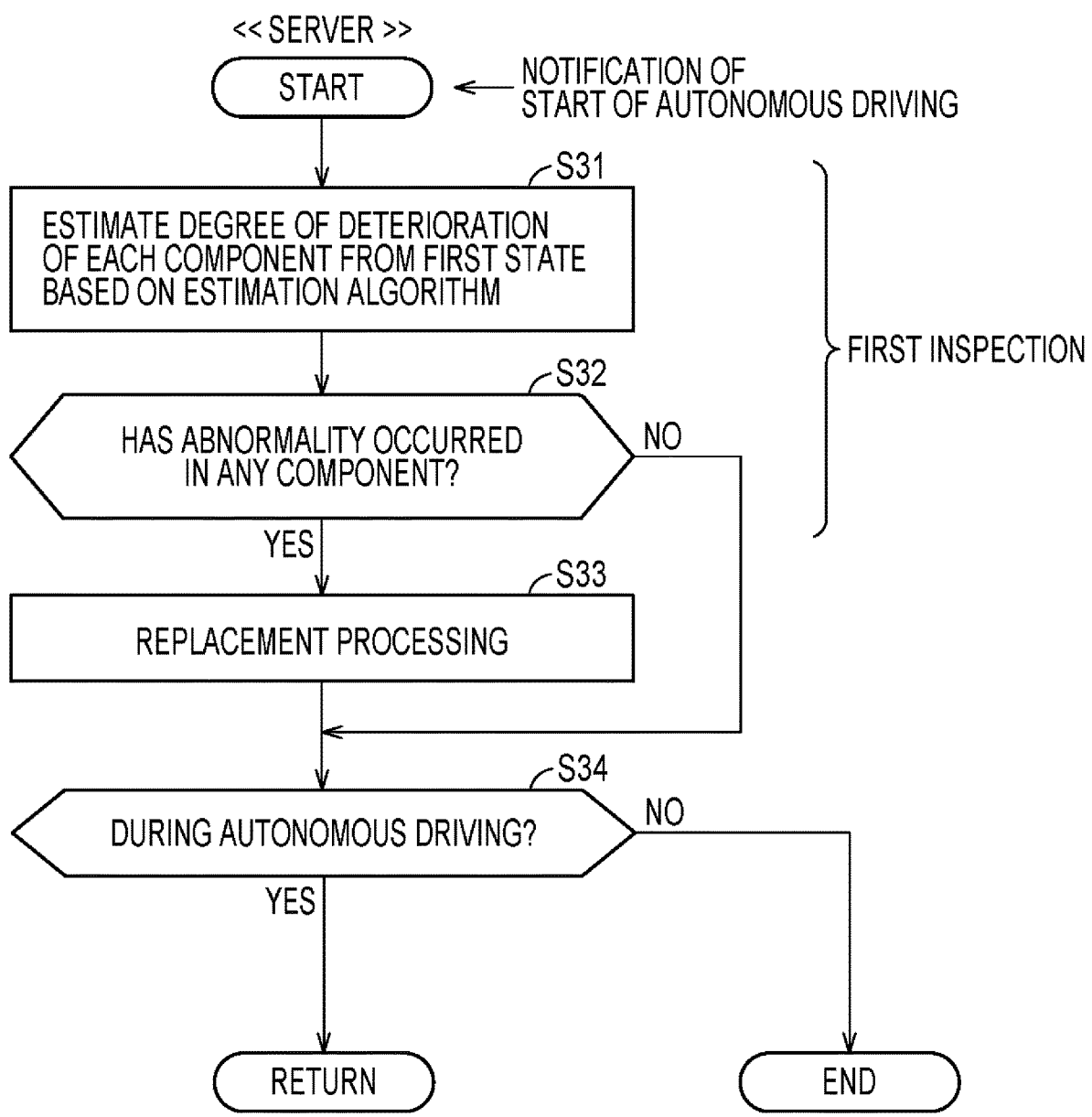
FIG. 9 is a flowchart showing processing related to the first inspection executed by the server according to the embodiment of the present disclosure.

FIG. 9 is a flowchart showing processing related to the first inspection executed by the server 500. The processing shown in this flowchart is repeatedly executed during autonomous driving of the vehicle 1. For example, in a case where the server 500 receives the start signal indicating the start of autonomous driving of the vehicle 1, a series of processing shown in FIG. 9 described below is started.

With reference to FIG. 9 together with FIGS. 1 to 6, in S31, the server 500 estimates the current degree of deterioration of each target component (MG 20, battery 160, suspension 170, and braking device 180) of the vehicle 1 by using the first state sequentially received from the vehicle 1 (that is, the first state indicated by the first inspection signal transmitted in S13 of FIG. 7). Specifically, the server 500 estimates the progress degree of deterioration of each target component caused by the aging deterioration during autonomous driving from the current first state indicated by the most recently received first inspection signal by using the estimation algorithm E (FIG. 6). The server 500 updates Table T1 (FIG. 6) by adding the estimated progress degree of deterioration of each target component to the degree of deterioration of the corresponding target component in Table T 1. Moreover, the server 500 acquires the current degree of deterioration of each target component from updated Table T1. It should be noted that the server 500 considers that the first state indicated by the most recently received first inspection signal is maintained until the next first inspection signal is received.

In following S32, the server 500 determines whether or not the abnormality occurs in any of the target components in the vehicle 1. Specifically, the server 500 determines whether or not the current degree of deterioration exceeds a predetermined threshold value for each target component mounted on the vehicle 1. In the present embodiment, the inspections of the in-vehicle components executed in S31 and S32 correspond to the first inspection for the vehicle 1. The threshold value described above can be optionally set for each target component. In a case where the degree of deterioration of at least one target component exceeds the threshold value, a fail is determined by the first inspection (YES in S32), and the processing proceeds to S33. The fact that a fail is determined by the first inspection means that the abnormality caused by aging deterioration has occurred in any of the target components.

In S33, the server 500 executes predetermined replacement processing for the vehicle 1. In the predetermined replacement process, at least one of recording, notification, and transmission of the result of the first inspection is executed. The result of the first inspection includes information indicating a component that needs to be replaced (that is, the target component of which the degree of deterioration exceeds the threshold value). The server 500 may record the result of the first inspection in the storage device 503. The server 500 may transmit the result of the first inspection to the vehicle 1 or a predetermined terminal, and cause a predetermined notification device (for example, the HMI 230 or the mobile terminal UT) to execute notification processing of prompting the user of the vehicle 1 to replace the component. The server 500 may prohibit the operation of the vehicle 1 in S33 and execute processing of preparing a substitute vehicle.

In a case where the processing of S33 is executed, the processing proceeds to S34. On the other hand, in a case where the degree of deterioration of any of the target components does not exceed the threshold value in the vehicle 1, a pass is determined by the first inspection (NO in S32), the replacement processing (S33) is not executed, and the processing proceeds to S34. In S34, the server 500 determines whether or not the vehicle 1 is during autonomous driving. In a case where the server 500 receives, for example, the end signal indicating the end of the autonomous driving of the vehicle 1, the server 500 determines that the autonomous driving of the vehicle 1 ends. In a case where the vehicle 1 is during autonomous driving (YES in S34), the processing returns to the first step (S31). In a case where the vehicle 1 is not during autonomous driving (NO in S34), the series of processing shown in FIG. 9 ends.

Figure 10:
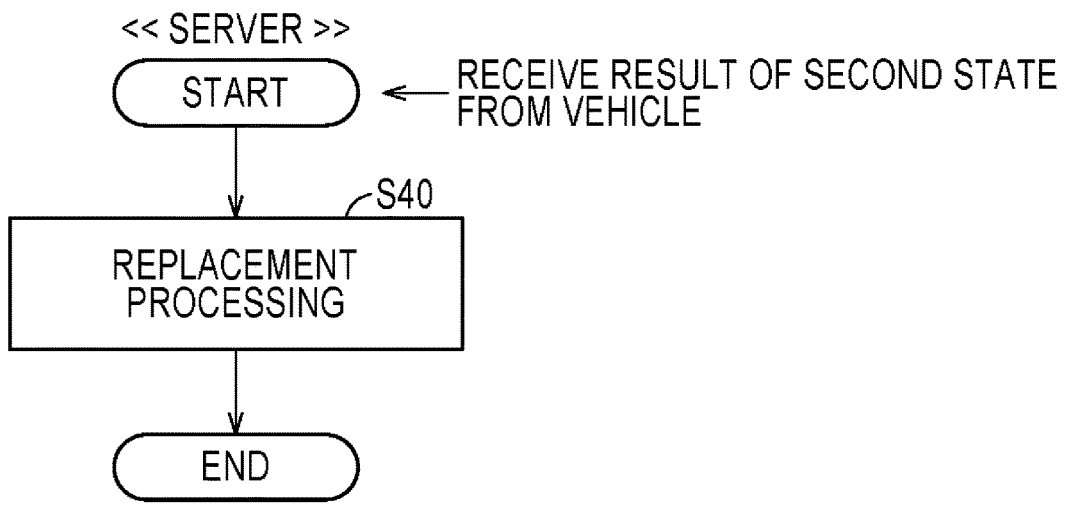
FIG. 10 is a flowchart showing processing related to the second inspection executed by the server according to the embodiment of the present disclosure.

FIG. 10 is a flowchart showing processing related to the second inspection executed by the server 500. The processing shown in this flowchart is started each time, for example, the server 500 receives the second inspection signal from the vehicle 1. The fact that the server 500 receives the second inspection signal from the vehicle 1 means that the air leak (puncture) of the tire has occurred in the vehicle 1.

With reference to FIG. 10 together with FIGS. 1 to 6, in S40, the server 500 executes the predetermined replacement processing for the vehicle 1. In S40, at least one of recording, notification, and transmission of the inspection result (result of the second inspection) may be executed, as in S33 of FIG. 9. The result of the second inspection includes information indicating the tire that needs to be replaced or repaired (tire in which the air leak has occurred). In a case where the processing of S40 is executed, a series of processing shown in FIG. 10 ends.

As described above, the vehicle inspection method according to the present embodiment includes the processing shown in FIGS. 7 to 10. In S13 (first transmission step) of FIG. 7, the vehicle 1 transmits the signal (first inspection signal) indicating the first state detected by the first sensor mounted on the vehicle 1 to the server 500, during autonomous driving. In S32 (first determination step) of FIG. 9, the server 500 determines a pass or a fail of the vehicle 1 for the first inspection item by using the first state indicated by the first inspection signal received from the vehicle 1. In S22 (second determination step) of FIG. 8, the vehicle 1 determines a pass or a fail for the second inspection item by using the second state detected by the second sensor mounted on the vehicle 1, during autonomous driving. In S23 (second transmission step) of FIG. 8, the vehicle 1 transmits the signal indicating the determination result of the second inspection item (second inspection signal) to the server 500 in a case where a fail is determined for the second inspection item. With such a vehicle inspection method, it is possible to reduce the load on the server 500 that manages the autonomous driving vehicle (for example, vehicle 1) and appropriately execute the maintenance of the autonomous driving vehicle.

The processing related to the first and second inspections is not limited to the aspects described above. For example, the processing related to the first inspection may be modified as described below. In the following, a modification example of the first inspection will be described with reference to FIGS. 11 to 13.

In the modification example described below, the server 500 executes a series of processing shown in FIG. 11. In addition, the control device 150 of the vehicle 1 executes a series of processing shown in FIG. 12 instead of the processing shown in FIG. 7. Further, the server 500 executes a series of processing shown in FIG. 13 instead of the processing shown in FIG. 9.

Figure 11:
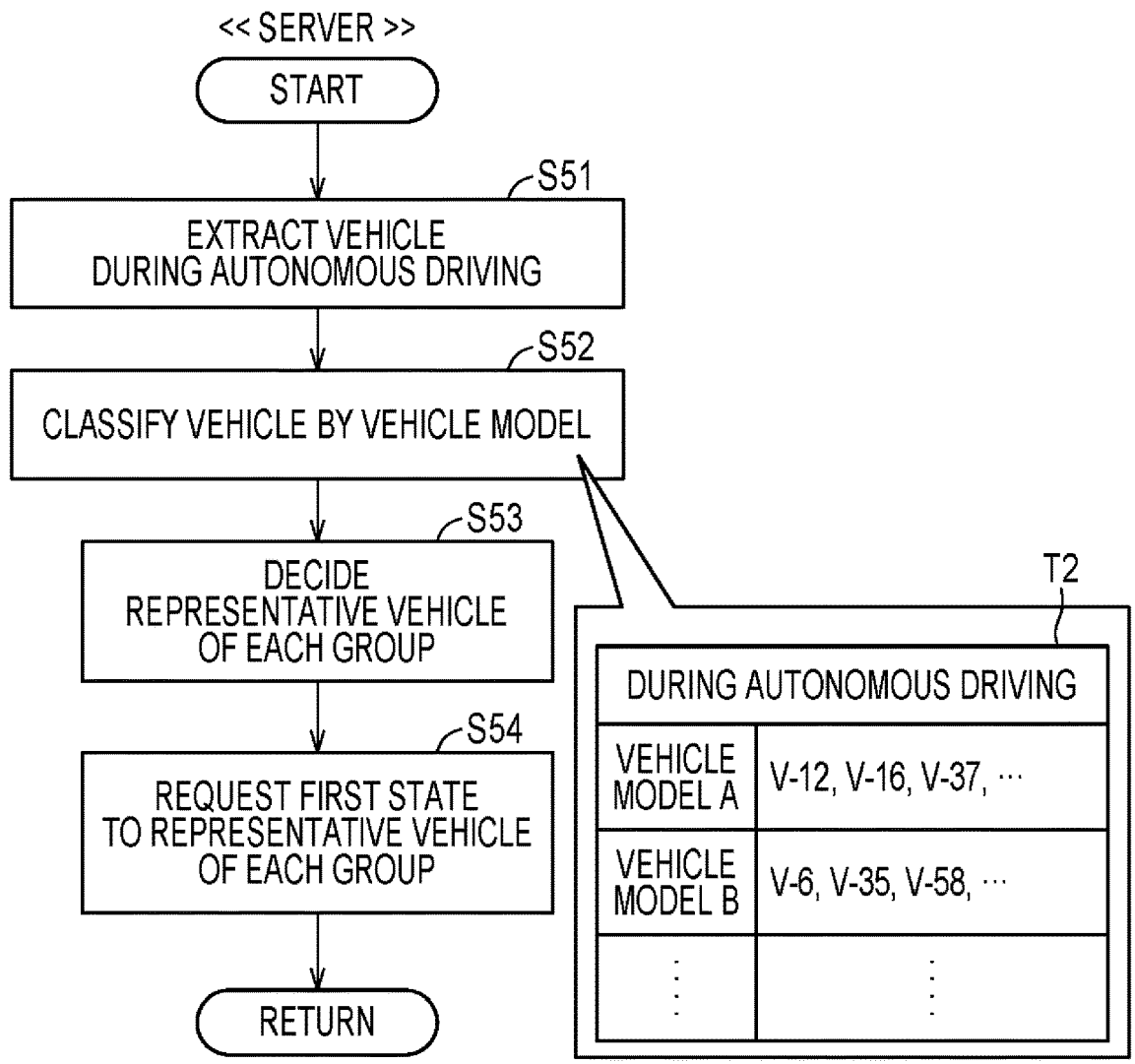
FIG. 11 is a flowchart showing request processing executed by the server in relation to a modification example of the first inspection.

FIG. 11 is a flowchart showing request processing executed by the server 500 in relation to the modification example of the first inspection. The processing shown in this flowchart is repeatedly executed at a predetermined cycle.

With reference to FIG. 11 together with FIGS. 1 to 6, in S51, the server 500 extracts the vehicle during autonomous driving from a plurality of registered vehicles. In this modification example, each vehicle registered in the server 500 has the configurations shown in FIGS. 1, 2, and 5, and is configured to execute autonomous driving by the processing shown in FIG. 3. The server 500 may determine whether or not each vehicle is during autonomous driving based on the start signal and the end signal described above (see FIG. 3).

In following S52, the server 500 classifies the vehicle during autonomous driving based on the vehicle model. The vehicles of the same vehicle model are classified into the same group. Table T2 shown in FIG. 11 indicates that, among the vehicles registered in the server 500, vehicles identified by the vehicle IDs "V-12", "V-16", "V-37", . . . , respectively, are during autonomous driving, and are the same vehicle model (vehicle model A). In addition, Table T2 shown in FIG. 11 indicates that, among the vehicles registered in the server 500, vehicles identified by the vehicle IDs "V-6", "V-35", "V-58", . . . , respectively, are during autonomous driving, and are the same vehicle model (vehicle model B). The classification of the vehicle model may be determined in accordance with a catalog of the automobile manufacturer.

In following S53, the server 500 decides one representative vehicle for each group (for each vehicle model). The deciding method of the representative vehicle is optional. It should be noted that, in a case where the representative vehicle is decided once, the representative vehicle is not changed until the representative vehicle stops autonomous driving. The representative vehicle may be randomly decided or may be decided in accordance with a predetermined criterion. The vehicle having the vehicle ID with the smallest numeral in the group may be selected as the representative vehicle. For example, the vehicle identified by the vehicle ID "V-12" in the group of the vehicle model A and the vehicle identified by the vehicle ID "V-6" in the group of the vehicle model B may be selected as the representative vehicle. In addition, a vehicle having high specifications related to sensing in each group may be preferentially selected as the representative vehicle.

In following S54, the server 500 transmits a signal requesting the first state (hereinafter, also referred to as a "request signal") to the representative vehicle of each group. In a case where the processing of S54 is executed, the processing returns to the first step (S51).

Figure 12:
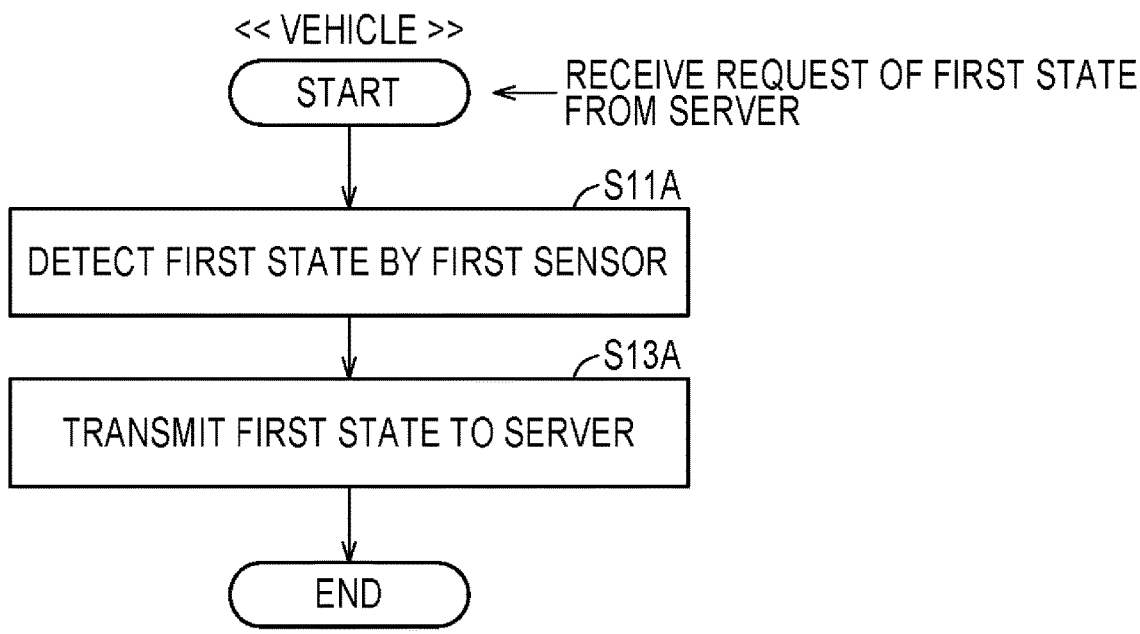
FIG. 12 is a flowchart showing transmission processing executed by the vehicle in relation to the modification example of the first inspection.

FIG. 12 is a flowchart showing transmission processing executed by the representative vehicle in relation to the modification example of the first inspection. The processing shown in this flowchart is started, for example, in a case where the representative vehicle receives the request signal from the server 500.

With reference to FIG. 12 together with FIGS. 1 to 6, the control device 150 of the representative vehicle executes the same processing as in S11 and S13 of FIG. 7 in S11A and S13A, respectively, and transmits the first inspection signal indicating the first state detected by the first sensor mounted on the representative vehicle to the server 500 together with the vehicle ID of the representative vehicle. In a case where the transmission of the first inspection signal (S13A) related to the representative vehicle is completed, the series of processing shown in FIG. 12 ends. The series of processing shown in FIG. 12 is executed solely by the representative vehicle. Since the electric power of the representative vehicle is consumed by the processing described above, a vehicle manager may give an incentive (compensation) to the user of the representative vehicle. The incentive for each user may be managed by the server 500.

Figure 13:
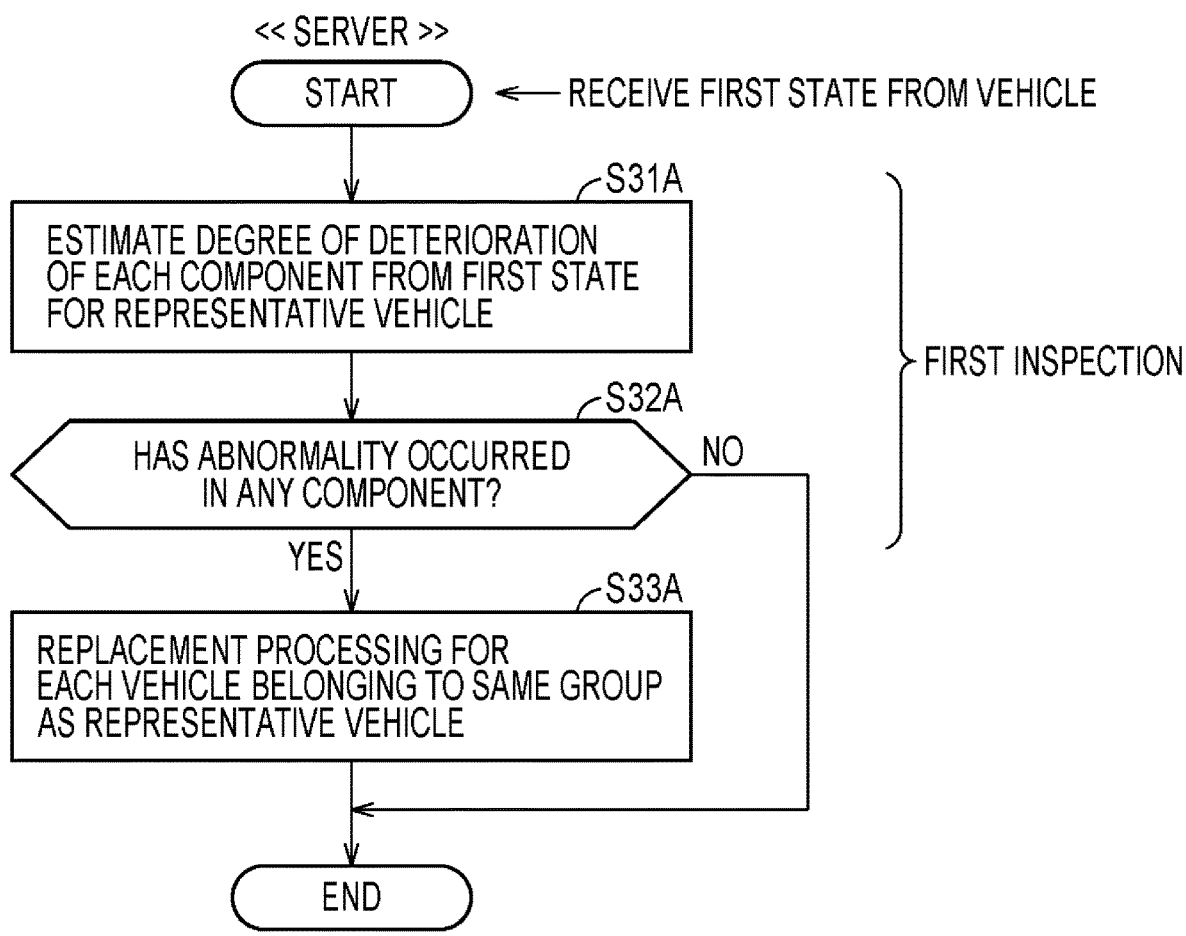
FIG. 13 is a flowchart showing determination processing executed by the server in relation to the modification example of the first inspection.

FIG. 13 is a flowchart showing determination processing executed by the server 500 in relation to the modification example of the first inspection. The processing shown in this flowchart is started, for example, in a case where the server 500 receives the first inspection signal from the representative vehicle.

With reference to FIG. 13 together with FIGS. 1 to 6, in S31A, the server 500 executes the same processing as in S31 of FIG. 9, and estimates the current degree of deterioration of each target component of the representative vehicle (MG 20, battery 160, suspension 170, braking device 180). Subsequently, the server 500 executes the same processing as in S32 of FIG. 9 in S32A, and determines whether or not the abnormality occurs in any of the target components in the representative vehicle. In this modification example, the inspections of the in-vehicle components executed in S31A and S32A correspond to the first inspection related to the representative vehicle. In a case where a fail is determined by the first inspection of the representative vehicle (YES in S32A), the processing proceeds to S33A. In a case where a fail is determined by the first inspection related to the representative vehicle (YES in S32A), the server 500 determines that the component abnormality caused by the aging deterioration has occurred in all the vehicles belonging to the same group as the representative vehicle.

In S33A, the server 500 executes the predetermined replacement processing for all the vehicles belonging to the same group as the representative vehicle. The predetermined replacement processing may be at least one of recording, notification, and transmission of the result of the first inspection, as in S33 of FIG. 9. It should be noted that in S33A, the predetermined replacement processing is executed for all the vehicles belonging to the same group as the representative vehicle, in addition to the representative vehicle. For example, in a case where a fail is determined by the first inspection related to the representative vehicle of the group of the vehicle model A shown in FIG. 11 (for example, the vehicle identified by the vehicle ID "V-12") (YES in S32A), in S33A, the predetermined replacement processing is executed for the vehicle identified by the vehicle IDs "V-12", "V-16", "V-37", . . . , respectively. In a case where the processing of S33A is executed, a series of processing shown in FIG. 13 ends.

On the other hand, in a case where the degree of deterioration of any of the target components does not exceed the predetermined threshold value in the representative vehicle, a pass is determined by the first inspection (NO in S32A), the replacement processing (S33A) is not executed, and the series of processing shown in 13 ends.

As described above, in the modification example described above, each of the vehicles managed by the server 500 includes the control device 150, the first sensor (for example, the wheel speed sensors 127A, 127B, the posture sensor 270, the monitoring module 160a, the weight sensor 170a, and the brake sensor 180a), the second sensor (for example, the air pressure sensor 20b), and the communication device 130 (see FIGS. 1, 2, and 5). The control device 150 mounted on the vehicle is configured to execute the control to cause the vehicle to travel by autonomous driving (see FIG. 3). The server 500 selects the representative vehicle (first vehicle) from the vehicles (see FIG. 11). The communication device 130 of the representative vehicle sequentially transmits the first state detected by the first sensor to the server 500 during autonomous driving of the representative vehicle (see FIGS. 11 and 12). The server 500 executes the first inspection for each of the vehicles (first vehicle and second vehicle) belonging to the same group as the representative vehicle by using the first state sequentially received from the representative vehicle (see FIG. 13). The vehicles belonging to the same group are the same vehicle model and travel by autonomous driving at the same time. The server 500 functions as an example of a "first inspection device" according to the present disclosure.

In the configuration described above, the first inspection related to the second vehicle (vehicle other than the representative vehicle belonging to the same group as the representative vehicle) is executed by using the first state sequentially transmitted from the first vehicle (representative vehicle) to the server 500. The detection value by the first sensor of the second vehicle is not transmitted from the second vehicle to the server 500, so that the amount of information transmitted from the second vehicle to the server 500 can be reduced. With the configuration described above, it is possible to reduce the amount of information transmitted from each vehicle to the server 500 and inspect many vehicles. It should be noted that the classification (group) into which each vehicle is classified is not limited to the group for each vehicle model. The grouping method can be changed as appropriate.

The second inspection is executed in the same manner as in the embodiment described above in the modification example described above. That is, the control device 150 of each vehicle executes the processing shown in FIG. 8, and the server 500 executes the processing shown in FIG. 10. The control device 150 of each vehicle managed by the server 500 functions as an example of a "second inspection device" according to the present disclosure. The control device 150 of each vehicle executes the second inspection by using the second state detected by the second sensor during autonomous driving of the vehicle, and transmits the result of the second inspection to the server 500 in a case where a fail is determined by the second inspection (FIG. 8). The processing shown in FIG. 8 is executed for each vehicle, and the second inspection is executed for each vehicle. With such a configuration, in addition to the first inspection described above, the second inspection with high real-time performance (see FIG. 4) can be appropriately executed.

The first inspection item and the second inspection item are not limited to the items shown in FIG. 4, and can be changed as appropriate. For example, even in a case where the item for checking the presence or absence of liquid leak (for example, an oil leak, such as a brake oil leak) may be adopted as the second inspection item instead of or in addition to the item for checking the presence or absence of the air leak of the tire. In a vehicle including an engine (internal combustion engine), an item for checking the presence or absence of an abnormality in the engine coolant temperature may be adopted as the second inspection item.

The configuration of the vehicle is not limited to the configuration described in the embodiment described above (see FIGS. 1, 2, and 5). The base vehicle may have an autonomous driving function without retrofitting. A level of autonomous driving may be fully autonomous driving (level 5) or conditional autonomous driving (for example, level 4). The configuration of the vehicle may be changed to a configuration dedicated to unmanned traveling, as appropriate. For example, a vehicle dedicated to unmanned traveling does not have to include the component (steering wheel or the like) for a person to operate the vehicle. The vehicle may include a solar panel or may have a flight function. The vehicle is not limited to a passenger car, and may be a bus or a truck. The vehicle may be a privately owned vehicle (POV). The vehicle may be a multipurpose vehicle customized in accordance with the user's purpose of use. The vehicle may be a mobile store vehicle, a robotaxi, an automated guided vehicle (AGV), or an agricultural machine. The vehicle may be an unmanned or one-passenger small BEV (for example, a Micro Pallet).

The embodiment disclosed this time should be considered to be exemplary examples and not to be restrictive in all respects. The technical scope of the present disclosure is shown by the scope of claims rather than the description of the embodiment described above, and is intended to include all changes within the meaning and scope equivalent to the scope of claims.

What is claimed is:

1. A vehicle management system comprising:
   a vehicle; and
   a server, wherein:
   the server includes a first inspection device configured to execute a first inspection of determining a pass or a fail for a first inspection item, the first inspection device comprising a first sensor configured to detect a first state corresponding to the first inspection item;
   the vehicle includes
     a control device configured to execute control to cause the vehicle to travel by autonomous driving,
     a second inspection device configured to execute a second inspection of determining a pass or a fail for a second inspection item different from the first inspection item, the second inspection device comprising a second sensor configured to detect a second state corresponding to the second inspection item, and
     a communication device comprising a communication interface for transmitting data to the server;
   the communication device is configured to sequentially transmit the first state detected by the first sensor during autonomous driving of the vehicle to the server;
   the first inspection device is configured to execute the first inspection for the vehicle by using the first state sequentially received from the vehicle;
   the second inspection device is configured to execute the second inspection by using the second state detected by the second sensor during autonomous driving of the vehicle; and
   the communication device is configured to transmit a result of the second inspection to the server in a case where a fail is determined by the second inspection;
   wherein requested real-time performance is higher in the second inspection item than in the first inspection item.

2. The vehicle management system according to claim 1, wherein:
   the first inspection item includes an item for checking presence or absence of a component abnormality caused by aging deterioration; and
   the second inspection item includes an item for checking presence or absence of an air leak of a tire.

3. The vehicle management system according to claim 1, wherein:
   the first state includes at least one of weight of the vehicle, a vehicle speed of the vehicle, the number of stops of the vehicle, the number of times of sudden braking of the vehicle, a position of the vehicle, and an SOC of a power storage device mounted on the vehicle; and
   the second state includes an air pressure of a tire.

4. The vehicle management system according to claim 1, wherein the communication device is configured to transmit the first state detected by the first sensor to the server in a case where a degree of deviation between the first state detected by the first sensor during autonomous driving of the vehicle and the first state that is most recently transmitted exceeds a predetermined level, and not to transmit the first state detected by the first sensor to the server in a case where the degree of deviation does not exceed the predetermined level.

5. The vehicle management system of claim 1, wherein a first cycle is a detection cycle of the first state, and a second cycle is an execution cycle of the second inspection, and the second cycle is shorter than the first cycle.

6. A vehicle management system comprising:
   a first vehicle;
   a second vehicle; and
   a server, wherein:
   the server includes a first inspection device configured to execute a first inspection of determining a pass or a fail for a first inspection item;
   each of the first vehicle and the second vehicle includes
     a control device configured to execute control to cause the vehicle to travel by autonomous driving,
     a second inspection device configured to execute a second inspection of determining a pass or a fail for a second inspection item different from the first inspection item,
     a first sensor configured to detect a first state corresponding to the first inspection item,
     a second sensor configured to detect a second state corresponding to the second inspection item, and
     a communication device;
   the communication device of the first vehicle is configured to sequentially transmit the first state detected by the first sensor of the first vehicle during autonomous driving of the first vehicle to the server;
   the first inspection device is configured to execute the first inspection for each of the first vehicle and the second vehicle by using the first state sequentially received from the first vehicle; and
   the second inspection device of each of the first vehicle and the second vehicle is configured to execute the second inspection by using the second state detected by the second sensor during autonomous driving of the vehicle, and to transmit a result of the second inspection to the server in a case where a fail is determined by the second inspection;
   wherein requested real-time performance is higher in the second inspection item than in the first inspection item.

7. The vehicle management system according to claim 6, wherein the first vehicle and the second vehicle travel by autonomous driving at the same time.

8. The vehicle management system according to claim 6, wherein the first vehicle and the second vehicle are the same vehicle model.

9. A vehicle inspection method comprising:
   transmitting a first state detected by a first sensor mounted on a vehicle to a server via the vehicle during autonomous driving;
   determining a pass or a fail of the vehicle for a first inspection item by using the first state received from the vehicle via the server;

determining a pass or a fail for a second inspection item by using a second state detected by a second sensor mounted on the vehicle via the vehicle during autonomous driving; and transmitting a determination result of the second inspection item to the server via the vehicle in a case where a fail is determined for the second inspection item;

wherein requested real-time performance is higher in the second inspection item than in the first inspection item.

10. The vehicle inspection method according to claim 9, wherein requested real-time performance is higher in the second inspection item than in the first inspection item.

11. The vehicle inspection method according to claim 9, wherein:

the first inspection item includes an item for checking presence or absence of a component abnormality caused by aging deterioration; and the second inspection item includes an item for checking presence or absence of an air leak of a tire.

12. The vehicle inspection method according to claim 9, wherein:

the first state includes at least one of weight of the vehicle, a vehicle speed of the vehicle, the number of stops of the vehicle, the number of times of sudden braking of the vehicle, a position of the vehicle, and an SOC of a power storage device mounted on the vehicle; and the second state includes an air pressure of a tire.

* * * * *